(12) United States Patent
Lee et al.

(10) Patent No.: US 8,559,986 B2
(45) Date of Patent: Oct. 15, 2013

(54) METHOD AND SYSTEM FOR CHANGING ACCESS SERVICE NETWORK OF MOBILE STATION IN COMMUNICATION SYSTEM

(75) Inventors: Ji-Cheol Lee, Suwon-si (KR); Alper Yegin, Istanbul (TR); Nae-Hyun Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 12/894,743

(22) Filed: Sep. 30, 2010

(65) Prior Publication Data

US 2011/0076987 A1     Mar. 31, 2011

(30) Foreign Application Priority Data

Sep. 30, 2009 (KR) .................. 10-2009-0093585

(51) Int. Cl.
*H04W 60/04* (2009.01)
*H04W 68/00* (2009.01)
*H04W 84/12* (2009.01)

(52) U.S. Cl.
USPC ............. 455/466; 455/411; 455/456.2; 726/3

(58) Field of Classification Search
USPC ................ 455/432.1–444, 466; 370/328–338
See application file for complete search history.

(56) References Cited

U.S. PATENT DOCUMENTS

| | | | |
|---|---|---|---|
| 2007/0218926 A1* | 9/2007 | Zhuang et al. | ................. 455/466 |
| 2009/0046619 A1 | 2/2009 | Du et al. | |
| 2009/0059864 A1* | 3/2009 | Suh et al. | ........................ 370/331 |
| 2011/0003595 A1* | 1/2011 | Shan | ............................ 455/436 |
| 2011/0149926 A1* | 6/2011 | Li et al. | ......................... 370/338 |

OTHER PUBLICATIONS

WiMAX Forum Network Architecture, Stage 3: Detailed Protocols and Procedures, WMF—T33-001-R010v04, Feb. 3, 2009.

* cited by examiner

*Primary Examiner* — Kashif Siddiqui
(74) *Attorney, Agent, or Firm* — Jefferson IP Law, LLP

(57) ABSTRACT

A method and a system for relocating an Access Service Network (ASN) of a Mobile Station (MS) in a communication system are provided. In the method, when an MS that operates in an idle mode moves from a first ASN to a second ASN, the MS transmits a ranging request message to a base station of the second ASN in order to update a location. The base station transmits a location update request message to an ASN-GateWay (GW) of the second ASN according to the ranging request message. When the location update request message is received, the ASN-GW transmits a relocation notify message including type information for location update to the first ASN. The first ASN transmits a relocation notify response message including paging information to the ASN-GW according to the relocation notify message.

12 Claims, 12 Drawing Sheets

METHOD AND SYSTEM FOR CHANGING ACCESS SERVICE NETWORK OF MOBILE STATION IN COMMUNICATION SYSTEM

PRIORITY

This application claims the benefit under 35 U.S.C. §119 (a) of a Korean patent application filed in the Korean Intellectual Property Office on Sep. 30, 2009 and assigned Serial No. 10-2009-0093585, the entire disclosure of which is hereby incorporated by reference.

BACKGROUND OF THE INVENTION

1. Field of the Invention

The present invention relates to a handover method of a terminal and a system thereof in a communication system. More particularly, the present invention relates to a method and a system for changing an Access Service Network (ASN) of a Mobile Station (MS) in a communication system.

2. Description of the Related Art

In the case where an ASN of an MS in a communication system changes, the communication system needs to change a Paging Control (PC), an Anchor Data Path Function (ADPF), and an authenticator server of the MS, and re-authenticate the MS. For example, when the ASN of the MS that operates in an idle mode changes, the communication system updates the location of the MS.

After that, the communication system performs a paging for the MS and an Idle Mode-Exit (IM-Exit) procedure. At this point, the communication system switches the MS that operates in an idle mode into an active mode.

In addition, the communication system changes an ADPF and an authenticator server of the MS, and re-authenticates the MS.

After changing the PC, the ADPF, and the authenticator server of the MS, and completing re-authentication, the communication system performs a path registration release procedure in order to switch the mode of the MS to the idle mode.

As described above, when the ASN of the MS changes, a delay occurs while the MS and the ASN transmit/receive messages for changing the PC, the ADPF, and the authenticator server. In this case, the MS may fail to enter a network due to the delay caused by message transmission/reception.

SUMMARY OF THE INVENTION

An aspect of the present invention is to address at least the above-mentioned problems and/or disadvantages and to provide at least the advantages described below. Accordingly, an aspect of the present invention is to provide a method and a system for changing an Access Service Network (ASN) of a Mobile Station (MS) in a communication system.

Another aspect of the present invention is to provide a method and a system for simplifying a procedure for changing an ASN of an MS in a communication system.

Still another aspect of the present invention is to provide a method and a system for reducing a time delay caused by authentication of an MS in the case where an ASN of the MS changes in a communication system.

Yet another aspect of the present invention is to provide a method and a system for simplifying a procedure for changing an ASN of an MS that operates in an idle mode in a communication system.

Yet still another aspect of the present invention is to provide a method and a system for simplifying a procedure for changing an ASN while an MS that has operated in an idle mode switches into an active mode in a communication system.

Yet further another aspect of the present invention is to provide a method and a system for simplifying a procedure for changing an ASN of an MS that has operated in an active mode in a communication system.

In accordance with an aspect of the present invention, a method for changing an ASN of an MS in a communication system is provided. The method includes, when an MS that operates in an idle mode moves from a first ASN to a second ASN, transmitting, at the MS, a ranging request message to a base station of the second ASN in order to update a location, transmitting, at the base station, a location update request message to an ASN-GateWay (GW) of the second ASN according to the ranging request message, when the location update request message is received, transmitting, at the ASN-GW, a relocation notify message including type information for location update to the first ASN, and transmitting, at the first ASN, a relocation notify response message including paging information to the ASN-GW according to the relocation notify message.

In accordance with another aspect of the present invention, a communication system for changing an ASN of an MS is provided. The system includes an MS that operates in an idle mode, for transmitting a ranging request message to a base station of a second ASN in order to update a location when moving from a first ASN to the second ASN, and a base station for transmitting a location update request message to an ASN-GW of the second ASN according to the ranging request message of the MS, wherein the ASN-GW, when a location update request message of the base station is received, transmits a relocation notify message including type information for location update to the first ASN, and wherein the first ASN transmits a relocation notify response message including paging information to the ASN-GW according to the relocation notify message of the ASN-GW.

In accordance with further another aspect of the present invention, a method for changing an ASN of an MS in a communication system is provided. The method includes, when an MS moves from a first ASN to a second ASN at a point of switching to an idle mode to an active mode, transmitting, at the MS, a ranging request message to a base station of the second ASN in order to switch to the active mode, transmitting, at the base station, a request message for transition to the active mode to an ASN-GW of the second ASN according to the ranging request message, when the request message for transition to the active mode is received, transmitting, at the ASN-GW, a relocation notify message including type information for transition to the active mode to the first ASN, and transmitting, at the first ASN, a relocation notify response message including paging information to the ASN-GW according to the relocation notify message.

In accordance with yet further another aspect of the present invention, a method for changing an Access Service Network (ASN) of a Mobile Station (MS) in a communication system is provided. The method includes, when an MS that operates in an active mode moves from a first ASN to a second ASN, transmitting a ranging request message to a base station of the second ASN in order to perform a handover, transmitting, at the base station, a context request message to an ASN-GW of the second ASN according to the ranging request message, transmitting, at the ASN-GW, a relocation notify message including type information for a handover trigger to the first ASN according to the context request message, and transmitting, at the first ASN, a relocation notify response message including paging information to the ASN-GW according to the relocation notify message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for simplifying an ASN change procedure of an MS in a communication system.

Figure 1:
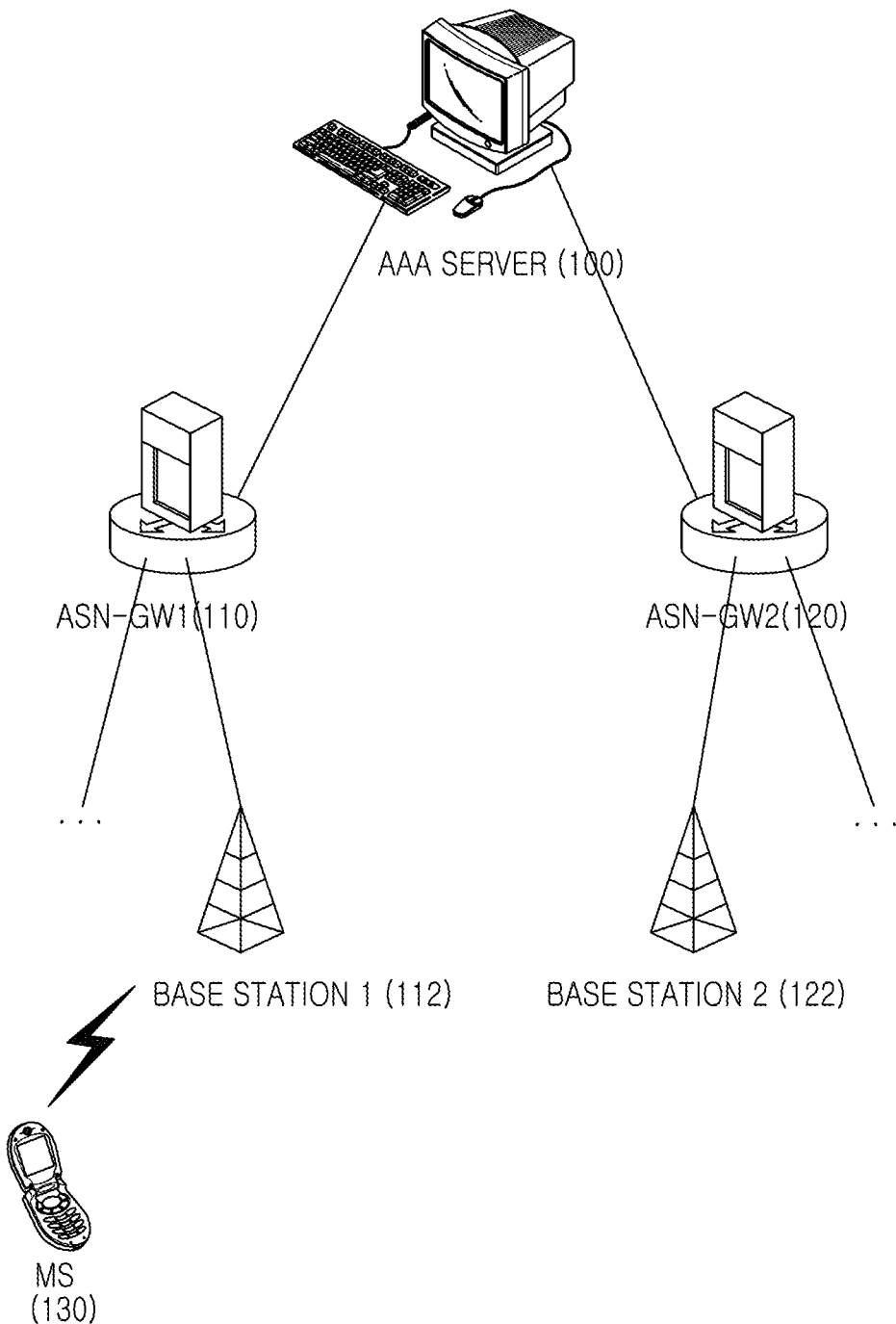
FIG. 1 is a view illustrating a construction of a wireless communication system according to an exemplary embodiment of the present invention.

FIG. 1 is a view illustrating a construction of a wireless communication system according to an exemplary embodiment of the present invention.

Referring to FIG. 1, a wireless communication system includes an Authentication, Authorization, Accounting (AAA) server 100, Access Service Network-Gateways (ASN-GWs) 110 and 120, base stations 112 and 122, and a Mobile Station (MS 130). Here, each of the ASN-GWs 110 and 120 include an authenticator server.

In the case where the MS 130 accesses the base station 1 112, the MS 130 performs an authentication procedure with the Authentication, Authorization, Accounting (AAA) server 100 through the ASN-GW 1 110. For example, the MS 130 and the AAA server 100 perform an authentication procedure through the authenticator server 1 included in the ASN-GW 1 110.

Figure 2A:
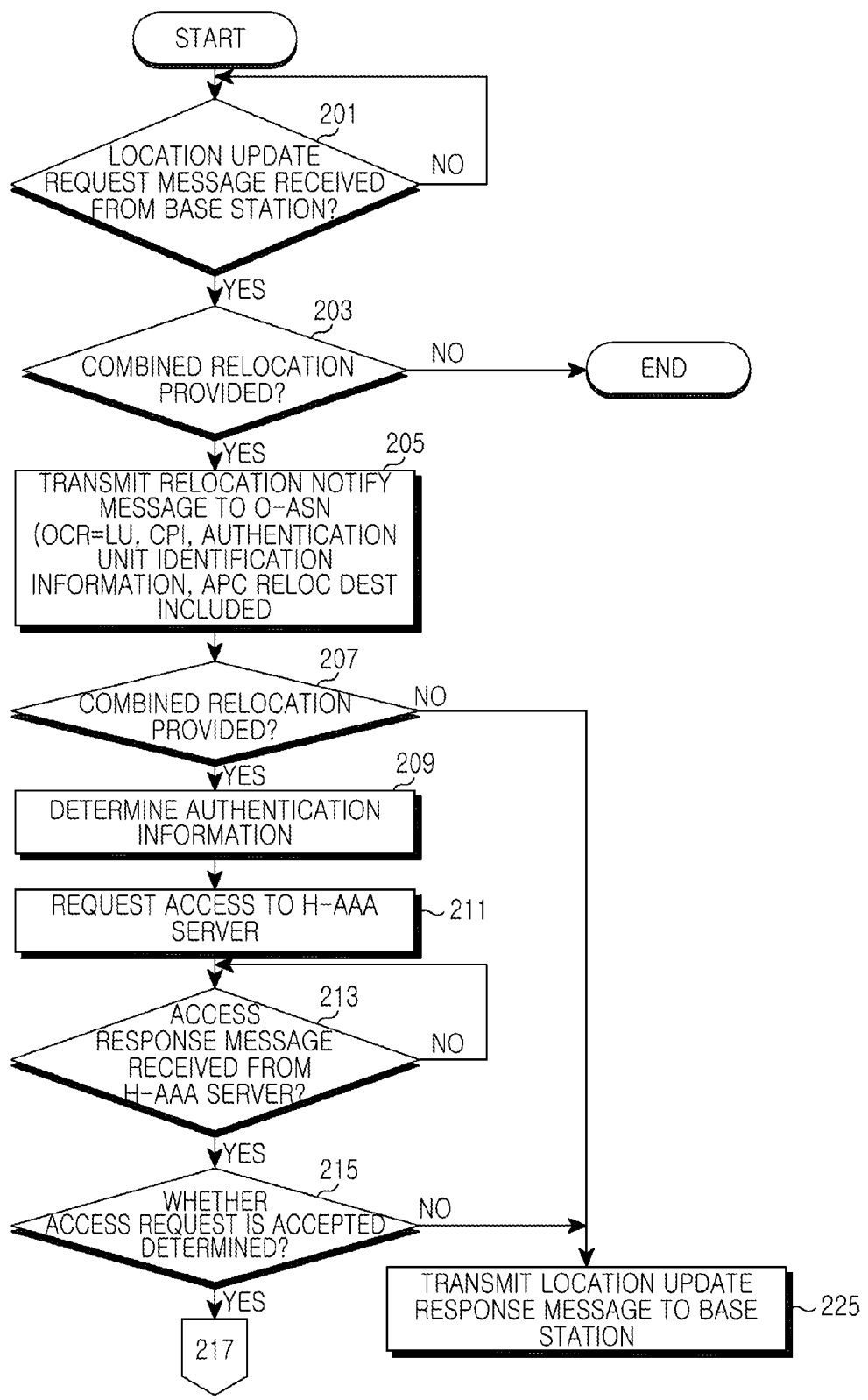
FIGS. 2A and 2B are flowcharts illustrating a relocation procedure by a Location Update (LU) trigger in a New-Access Service Network (N-ASN) according to an exemplary embodiment of the present invention.
Figure 2B:
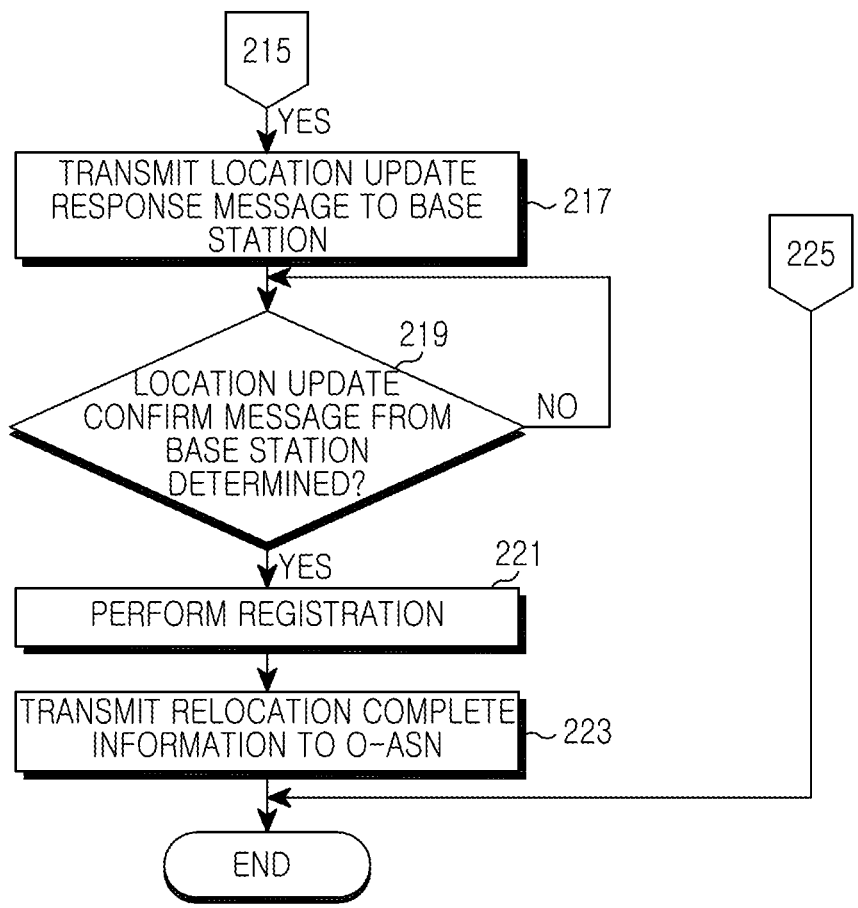

After performing the authentication procedure, when the MS 130 moves to a service area of the base station 2 122, an ASN-GW that provides a service to the MS 130 changes. For example, in the case where the MS 130 operates in an idle mode, the ASN-GW 2 120 operates as illustrated in FIGS. 2A and 2B in order to change an ASN of the MS 130. At this point, an authenticator server 2 included in the ASN-GW 2 120 performs an authentication procedure for the MS 130 using an authentication variable of the MS 130 obtained from the authenticator server 1.

In the following description, an Access Service Network (ASN) before the ASN-GW of the MS 130 changes is referred to as an Old (O)-ASN, and an ASN after the ASN-GW of the MS 130 changes is referred to as a New (N)-ASN.

FIGS. 2A and 2B are flowcharts illustrating a relocation procedure by a Location Update (LU) trigger in an N-ASN according to an exemplary embodiment of the present invention.

Referring to FIGS. 2A and 2B, an ASN-GW of the N-ASN determines whether a location update request message is received from a base station of the N-ASN in step 201.

When receiving the location update request message from the base station, the ASN-GW determines whether combined relocation for ASN change of an MS can be supported in step 203.

When the combined relocation cannot be supported, the ASN-GW ends the present algorithm.

In contrast, when the combined relocation can be supported, the ASN-GW transmits a relocation notify message to an O-ASN of the MS to start to change an ASN of the MS using combined relocation in step 205. At this point, the relocation notify message includes an Optimized Relocation (OR) type denoting a kind of a parameter included in the relocation notify message, Context Purpose Indicator (CPI) information set as a location update response context, authenticator server identifier information included in the ASN-GW, and anchor Paging Controller (PC) relocation destination information. In addition, in the case where the ASN-GW intends to update a Paging Group (PG) IDentifier (ID), paging offset information, and a paging period Type-Length-Value (TLV), the relocation notify message includes the PG ID, the paging offset information, and the paging period TLVs. Here, it is assumed that the OR type includes Optimized Combined Relocation (OCR) cause information denoting combined relocation by an LU trigger.

After that, the ASN-GW determines whether the O-ASN can support combined relocation in step 207. For example, the ASN-GW determines whether the O-ASN can support combined relocation using a relocation notify response message provided from the O-ASN.

When the O-ASN cannot support combined relocation, the ASN-GW transmits a location update response message including location update failure information to the base station in step 225.

After that, the ASN-GW ends the present algorithm.

In contrast, when the O-ASN can support combined relocation, the ASN-GW determines authentication information of the MS that changes an ASN from the relocation notify response message provided from the O-ASN in step 209. Here, the authentication information of the MS includes a random variable 1 for authentication of the ASN-GW and a Home (H)-AAA server, a random variable 2 for authentication of the ASN-GW and the O-ASN, a hash value for an authentication variable of the MS, and identifier information of the MS.

After determining the authentication information of the MS, the ASN-GW transmits a hash value for an authentication value of the MS provided from the O-ASN to the H-AAA server in step 211. For example, the ASN-GW transmits an access request message including a hash value for the authentication variable of the MS, a random variable 1, identifier information of the MS, and identifier information of the ASN-GW to the H-AAA server.

The ASN-GW determines whether an access response message is received from the H-AAA server in step 213.

When an access response message is received from the H-AAA server, the ASN-GW determines whether the H-AAA server has accepted the access request of the ASN-GW in step 215.

When the H-AAA server has not accepted the access request of the ASN-GW, the ASN-GW transmits a location update response message including location update failure information to the base station in step 225.

After that, the ASN-GW ends the present algorithm.

In contrast, when the H-AAA server has accepted the access request of the ASN-GW, the ASN-GW transmits a location update response message including location update success information to the base station in step 217. At this point, the location update response message includes a Physical Channel IDentifier (PCID) of an O-ASN, a PCID of an N-ASN, an authenticator server ID of the N-ASN, an Anchor Data Path Function (ADPF) ID of the N-ASN, MS information, and Authorization Key (AK) context information.

After transmitting the location update response message, the ASN-GW determines whether a location update confirm message is received from the base station in step 219. Here, the location update confirm message includes Cipher/hashed Message Authentication Code Key (CMAC_key) counter information.

When the location update confirm message is received from the base station, the ASN-GW performs a registration process with a Home Agent (HA)/Local Mobile Anchor (LMA) in step 221. That is, the ASN-GW performs a registration procedure for the MS with the HA. For example, the ASN-GW transmits a registration message or a Proxy Binding Update (PBU) to the HA/LMA. After that, the ASN-GW receives a registration response message or a Proxy Binding Ack (PBA) from the HA/LMA.

After performing the registration procedure with the HA/LMA, the ASN-GW transmits relocation complete information to the O-ASN in step 223. For example, the ASN-GW transmits a relocation complete request message to the O-ASN. At this point, the relocation complete request message includes MSHash 2 generated by the authenticator server of the ASN-GW. After that, when receiving a relocation complete response message from the O-ASN, the ASN-GW informs the O-ASN of reception of the relocation complete response message.

After that, the ASN-GW ends the present algorithm.

Figure 3:
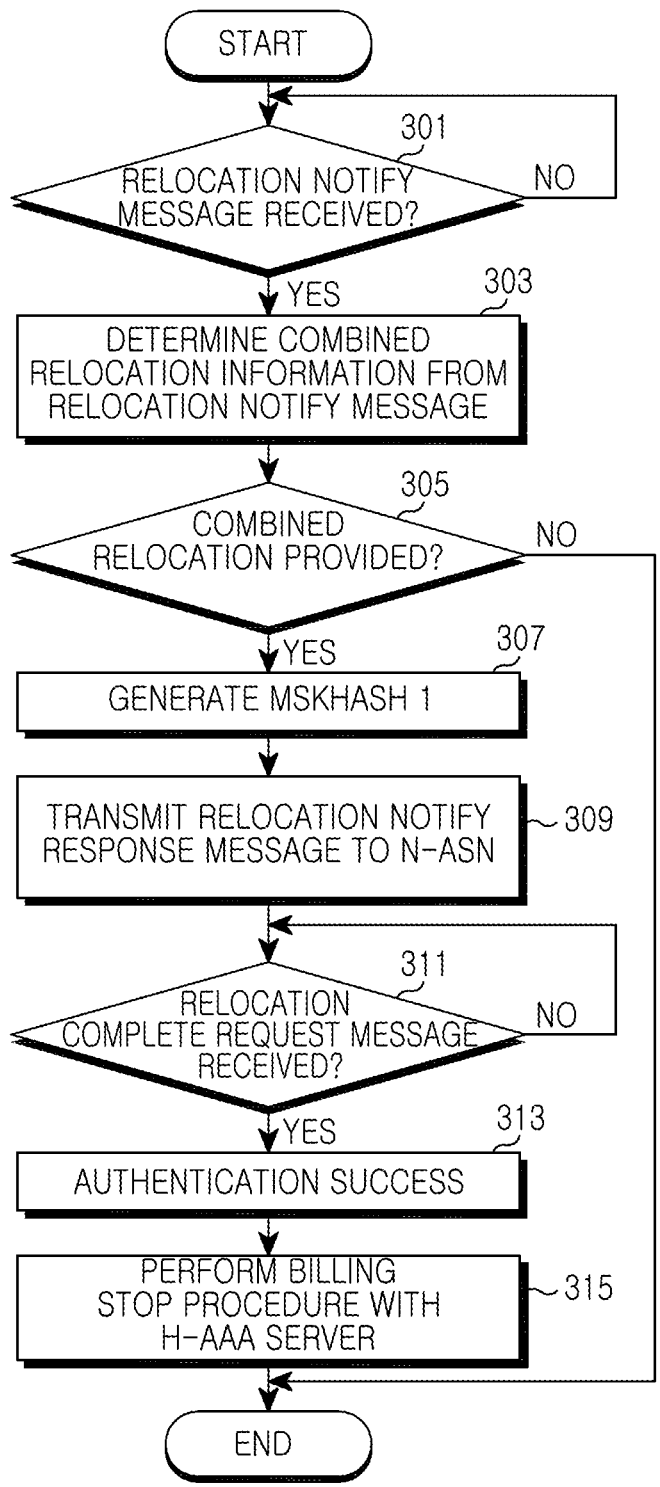
FIG. 3 is a flowchart illustrating a relocation procedure by an LU trigger in an Old-Access Service Network (O-ASN) according to an exemplary embodiment of the present invention.

In the case where the ASN of the MS that operates in the idle mode changes as described above, the N-ASN combines a relocation notify request message with location update information to transmit the same to the O-ASN. At this point, the O-ASN operates as illustrated in FIG. 3. In the following description, it is assumed that the N-ASN can support combined relocation for ASN change of an MS.

FIG. 3 is a flowchart illustrating a relocation procedure by an LU trigger in an O-ASN according to an exemplary embodiment of the present invention.

Referring to FIG. 3, an ASN-GW of the O-ASN determines whether a relocation notify message is received from an N-ASN in step 301.

When the relocation notify message is received from the N-ASN, the ASN-GW determines location update request information from the relocation notify message in step 303.

The ASN-GW determines whether combined relocation for ASN change of an MS can be supported in step 305.

When the combined relocation cannot be supported, the ASN-GW ends the present algorithm. In this case, the ASN-GW transmits a relocation notify response message including combined relocation failure information to the N-ASN.

In contrast, when the combined relocation can be supported, the ASN-GW generates a hash value for an authentication variable of the MS that changes an ASN in step 307.

After generating the hash value, the ASN-GW transmits a relocation notify response message to the N-ASN in step 309. Here, the relocation notify response message includes a random variable 1 for authentication of the N-ASN and an H-AAA server, a random variable 2 for authentication with the N-ASN and the ASN-GW, a hash value for an authentication variable of the MS, identifier information of the MS, base station information, paging information, a security history of the MS, an authentication history context of the MS, and an anchor Mobility Management (MM) context.

The ASN-GW determines whether a relocation complete request message is received from the N-ASN in step 311.

When receiving the relocation complete request message from the N-ASN, the ASN-GW authenticates the N-ASN with consideration of a hash value included in the relocation complete request message in step 313. In this case, though not shown, the ASN-GW transmits a relocation complete response message to the N-ASN.

After authenticating the N-ASN, the ASN-GW performs a billing stop procedure with the H-AAA server in step 315. For example, the ASN-GW transmits a billing stop message to the H-AAA server.

After that, the ASN-GW ends the present algorithm.

Hereinafter, a procedure for changing an ASN of an MS that operates in an idle mode in a wireless communication system is described. It is assumed that an MS that changes an ASN operates in an idle mode in FIG. 4.

Figure 4:
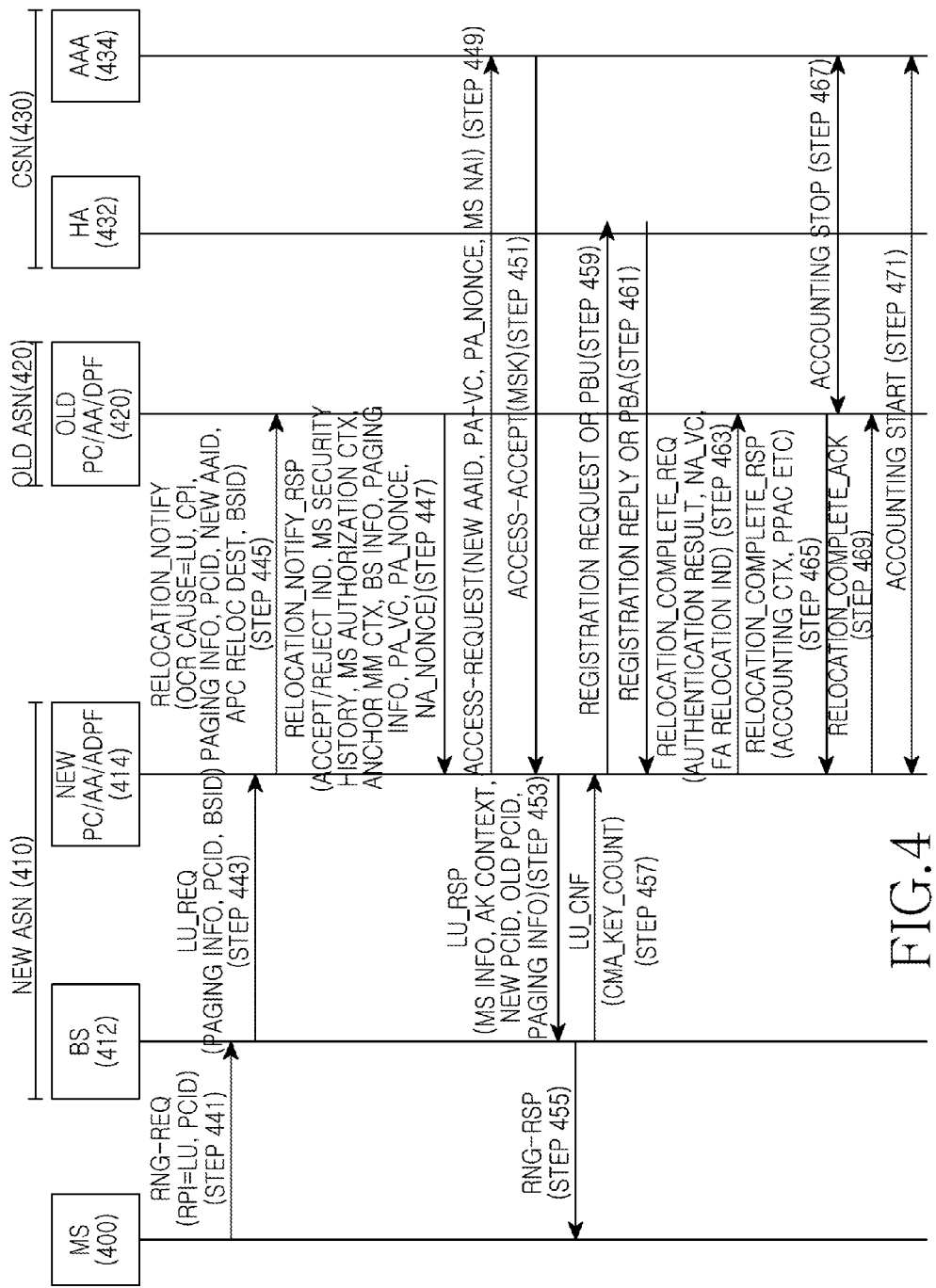
FIG. 4 is a diagram illustrating a combined relocation procedure by an LU trigger in a wireless communication system according to an exemplary embodiment of the present invention.

FIG. 4 is a diagram illustrating a combined relocation procedure by an LU trigger in a wireless communication system according to an exemplary embodiment of the present invention.

Referring to FIG. 4, the wireless communication system includes an MS 400, an N-ASN 410, an O-ASN 420, and a Connectivity Service Network (CSN) 430. Here, the N-ASN 410 includes a base station 412 and an ASN-GW 414. In addition, the ASN-GW 414 includes a PC/Anchor Authenticator (AA)/ADPF.

In the case where the MS 400 that has accessed a base station of the O-ASN 420 moves to the base station 412 of the N-ASN 410, a serving ASN of the MS 400 changes from the O-ASN 420 to the N-ASN 410.

When the ASN changes, the MS 400 transmits a ranging request message RNG-REQ to the base station 412 in order to start a location update procedure in step 441. At this point, the ranging request message denotes Ranging Purpose Indication (RPI), PC ID TLV, and CMAC tuple. The PC ID TLV denotes anchor PC information that replaces an anchor PC of the MS 400.

When the ranging request message is received, the base station 412 transmits a location update request message LU_Req to the ASN-GW 414 in step 443. Here, the location update request message includes PG ID, paging information, and a base station ID.

When the location update request message is received, the ASN-GW 414 determines whether combined relocation for ASN change of the MS 400 can be supported.

When the combined relocation can be supported, the ASN-GW 414 transmits a relocation notify message to the O-ASN 420 in step 445. At this point, the relocation notify message includes an OR type denoting a kind of a parameter included in the relocation notify message, CPI information set as a location update response context, authenticator server identifier information included in the ASN-GW, and anchor PC relocation destination information. In addition, in the case where the ASN-GW intends to update a PG ID, paging offset information, and a paging period TLV, the relocation notify message includes PG ID, paging offset information, and paging period TLVs. Here, it is assumed that the OR type includes Optimized Combined Relocation (OCR) cause information denoting combined relocation by an LU trigger.

When the relocation notify information is received, the O-ASN 420 determines whether combined relocation for ASN change of the MS 400 can be supported. When the combined relocation cannot be supported, the O-ASN 420 transmits a relocation notify response message Relocation_Notify_Rsp including combined relocation failure information to the N-ASN 410 in step 447.

In contrast, when the combined relocation can be supported, the O-ASN 420 generates a hash value for an authentication variable of the MS that changes an ASN. After that, the O-ASN 420 transmits a relocation notify response message including combined relocation accept information to the N-ASN 420 in step 447. Here, the relocation notify response message includes a random variable 1 for authentication of the N-ASN and an H-AAA server, a random variable 2 for authentication with the N-ASN and the ASN-GW, a hash value for an authentication variable of the MS, identifier information of the MS, base station information, paging information, a security history of the MS, an authentication history context of the MS, and an anchor MM context.

The ASN-GW 414 determines whether the O-ASN 420 has accepted combined relocation through the relocation notify response message. When the O-ASN 420 has not accepted the combined relocation, the ASN-GW 414 transmits a location update response message including combined relocation failure information to the base station 412.

In contrast, when the O-ASN 420 has accepted the combined relocation request, the ASN-GW 414 determines authentication information of the MS 400 from the relocation notify response message. Here, the authentication information of the MS 400 includes a random variable 1 for authentication of the ASN-GW 414 and an AAA server 434, a random variable 2 for authentication of the ASN-GW 414 and the O-ASN 420, a hash value for an authentication variable of the MS 400, and identifier information of the MS 400.

The ASN-GW 414 requests an access to the AAA server 434 in step 449. At this point, the ASN-GW 414 transmits an access request message including a hash value for an authentication variable of the MS 400, a random variable 1, identifier information of the MS 400, and identifier information of the ASN-GW 414 to the AAA server 434.

The AAA server 434 determines whether the hash value for the authentication variable of the MS 400 included in the access request message is valid. When the hash value is valid, the AAS server 434 transmits an access accept message including access success information to the ASN-GW 414 in step 451. Here, the access response message includes authentication variable information and Master Session Key (MSK) information.

In contrast, when the hash value is not valid, the AAA server 434 transmits an access response message including access failure information to the ASN-GW 414.

The ASN-GW 414 determines whether the AAA server 434 has accepted the access request from the access response message. When the AAA server 434 has not accepted the access request, the ASN-GW 414 transmits a location update response message including location update failure information to the base station 412.

In contrast, when the AAA server 434 has accepted the access request, the ASN-GW 414 transmits a location update response message LU-Rsp including location update success information to the base station 412 in step 453. At this point, the location update response message includes a PCID of an O-ASN, a PCID of an N-ASN, an authentication server ID of the N-ASN, an ADPF ID of the N-ASN, MS information, and AK context information.

When receiving a location update response message including location update failure information from the ASN-GW 414, the base station 412 transmits a ranging response message RNG-RSP including network re-entry start information to the MS 400.

When receiving a location update response message including location update success information from the ASN-GW 414, the base station 412 determines whether a CMAC key value of a ranging request message provided from the MS 400 is valid. When the CMAC key value is valid, the base station 412 transmits a ranging response message RNG-RSP including location update success information to the MS 400 in step 455.

In addition, when receiving a location update response message including location update success information from the ASN-GW 414, the base station 412 transmits a location update confirm message LU_Cnf to the ASN-GW 414 in step 457. Here, the location update confirm message includes CMAC_key counter information.

When the location update confirm message is received, the ASN-GW 414 transmits a registration request message or a PBU to an HA 432 in step 459.

When the registration request message or the PBU is received, the HA 432 transmits a registration response message or a Proxy Binding Ack (PBA) to the ASN-GW 414 in step 461.

When the registration response message or the PBA is received, the ASN-GW 414 transmits a relocation complete request message Relocation_Complete_Req to the O-ASN 420 in step 463. At this point, the relocation complete request message includes MSHash 2 generated by an authenticator server of the ASN-GW 414.

When the relocation complete request message is received, the O-ASN 420 authenticates the N-ASN 410 with consideration of a hash value included in the relocation complete request message. When authenticating the N-ASN 410, the O-ASN 420 transmits a relocation complete response message Relocation_Complete_Rsp to the N-ASN 410 in step 465. Here, the relocation complete response message includes billing context information and PrePaid Accounting Quota (PPAQ) information.

The O-ASN 420 performs a billing stop procedure with the AAA server 434 in step 467. For example, the O-ASN 420 transmits a billing stop message to the AAA server 434.

When receiving a relocation complete response message from the O-ASN 420, the ASN-GW 414 informs the O-ASN 420 of reception of the relocation complete response message in step 469.

The ASN-GW 414 performs a billing start procedure with the AAA server 434 in step 471. For example, the ASN-GW 414 transmits a billing start message to the AAA server 434.

The above exemplary embodiment has been described using an operation for ASN change of an MS that operates in an idle mode as an example.

Figure 5A:
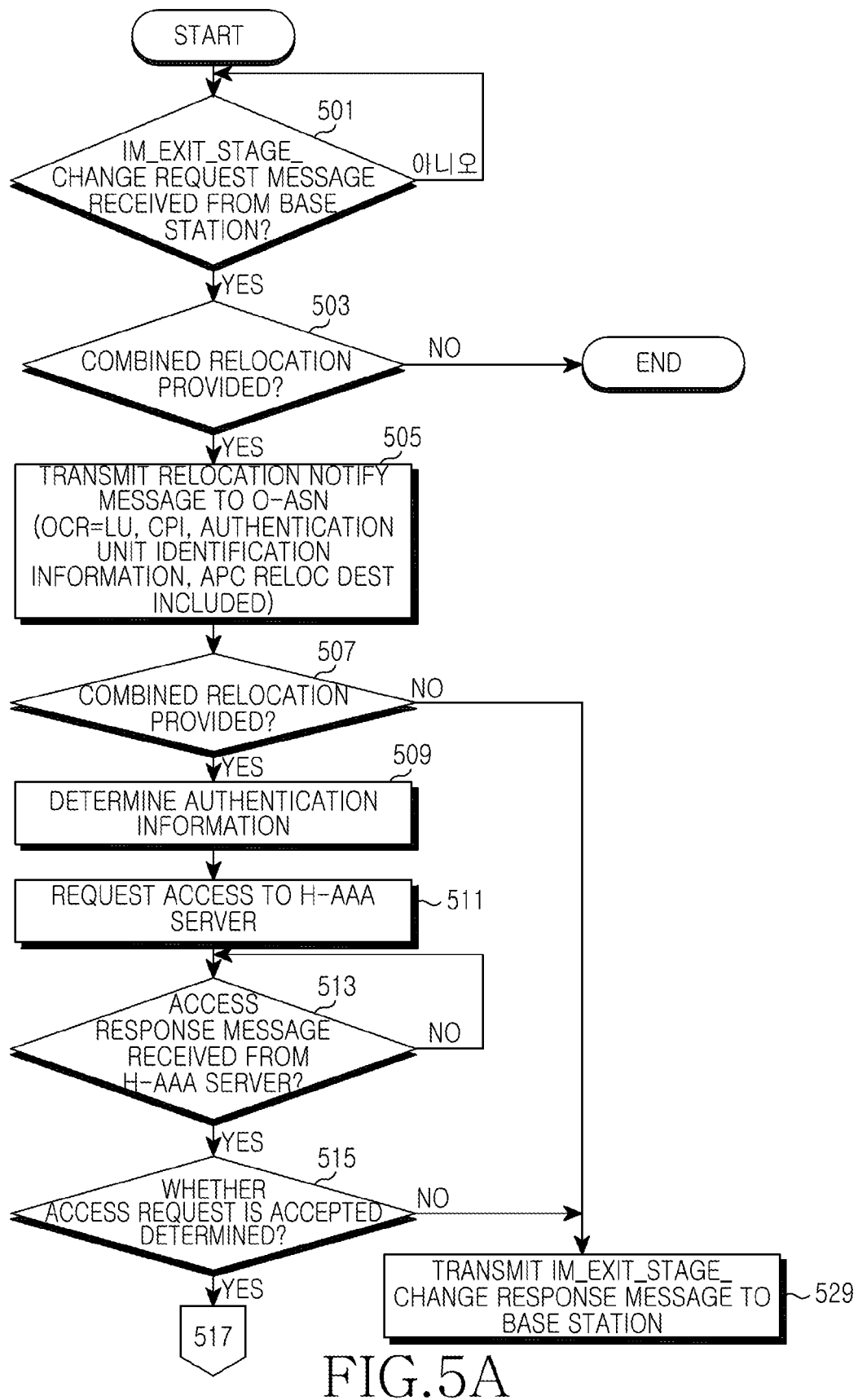
FIGS. 5A and 5B are flowcharts illustrating a relocation procedure by an Idle Mode-Exit (IM-Exit) trigger in an N-ASN according to an exemplary embodiment of the present invention.
Figure 5B:
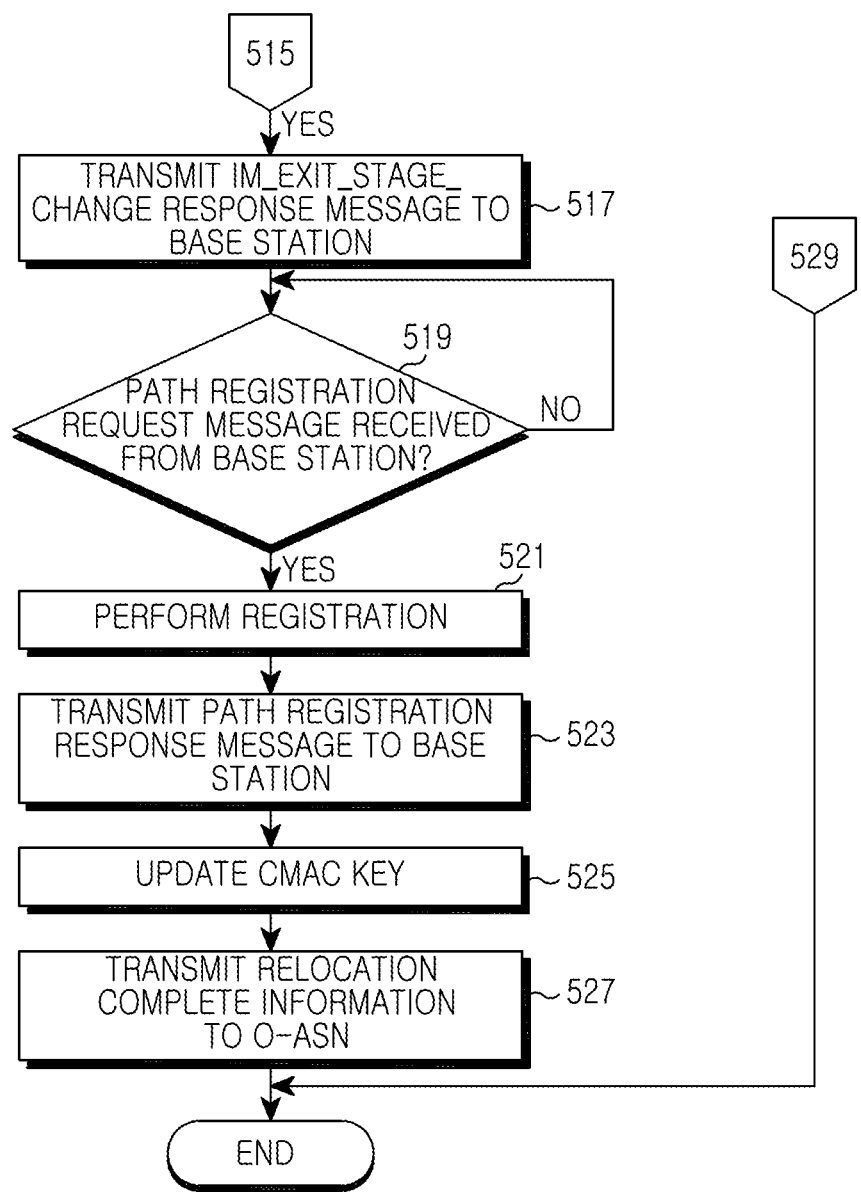

According to an exemplary embodiment of the present invention, in the case where an MS that has operated in an idle mode switches to an active mode when an ASN changes, an N-ASN operates as illustrated in FIGS. 5A and 5B to change the ASN of the MS.

FIGS. 5A and 5B are flowcharts illustrating a relocation procedure by an IM-Exit trigger in an N-ASN according to an exemplary embodiment of the present invention.

Referring to FIGS. 5A and 5B, an ASN-GW of the N-ASN determines whether an IM_Exit_Stage_Change request message is received from a base station of the N-ASN in step 501.

When receiving the IM_Exit_Stage_Change request message from the base station, the ASN-GW determines whether combined relocation for ASN change of an MS can be supported in step 503.

When the combined relocation cannot be supported, the ASN-GW ends the present algorithm.

In contrast, when combined relocation can be supported, the ASN-GW transmits a relocation notify message to an O-ASN of the MS in order to start the ASN change of the MS using the combined relocation in step 505. At this point, the relocation notify message includes an OR type denoting a kind of a parameter included in the relocation notify message, CPI information set as an anchor PC context value, and authenticator server identifier information included in the ASN-GW. Here, it is assumed that the OR type denotes OCR cause information denoting combined relocation by an IM-Exit trigger.

The ASN-GW determines whether an O-ASN can support combined relocation in step 507. For example, the ASN-GW determines whether the O-ASN can support combined relocation through a relocation notify response message provided from the O-ASN.

When the O-ASN cannot support the combined relocation, the ASN-GW transmits an IM_Exit_Stage_Change response message including failure indication set to a requested context unavailable value to the base station in step 529.

After that, the ASN-GW ends the present algorithm.

In contrast, when the O-ASN can support the combined relocation, the ASN-GW determines authentication information of the MS that changes an ASN from a relocation notify response message provided from the O-ASN in step 509. Here, the authentication information of the MS includes a random variable 1 for authentication of the ASN-GW and an H-AAA server, a random variable 2 for authentication of the ASN-GW and the O-ASN, a hash value for an authentication variable of the MS, and identifier information of the MS.

After determining the authentication information of the MS, the ASN-GW transmits a hash value for the authentication variable of the MS provided from the O-ASN to the H-AAA server in step 511. For example, the ASN-GW transmits an access request message including a hash value for the authentication variable of the MS, a random variable 1, identifier information of the MS, and identifier information of the ASN-GW to the H-AAA server.

The ASN-GW determines whether an access response message is received from the H-AAA server in step 513.

When the access response message is received from the H-AAA server, the ASN-GW determines whether the H-AAA server has accepted an access request of the ASN-GW in step 515.

When the H-AAA server has not accepted an access request of the ASN-GW, the ASN-GW transmits an IM_Exit_Stage_Change response message including failure indication set to a requested context unavailable value to the base station in step 529.

After that, the ASN-GW ends the present algorithm.

When the H-AAA server has accepted the access request of the ASN-GW, the ASN-GW transmits an IM_Exit_Stage_Change response message including IM_Exit_Stage_Change success information to the base station in step 517. At this point, the IM_Exit_Stage_Change response message includes an authentication server ID of an N-ASN, an ADPF ID of the N-ASN, MS information, and AK context information.

After transmitting the IM_Exit_Stage_Change response message, the ASN-GW determines whether a path registration request message is received from the base station in step 519.

When the path registration request message is received from the base station, the ASN-GW performs a registration procedure with an HA/LMA in step 521. For example, the ASN-GW transmits a registration request message or a PBU to the HA/LMA. After that, the ASN-GW receives a registration response message or a PBA from the HA/LMA.

The ASN-GW transmits a path registration response message to the base station in step 523. For example, an ADPF of the ASN-GW transmits a path registration response message to the base station.

After transmitting the path registration response message to the base station, the ASN-GW updates a CMAC key of the MS through negotiation with the base station in step 525.

After updating the CMAC key of the MS, the ASN-GW transmits relocation complete information to the O-ASN in step 527. For example, the ASN-GW transmits a relocation complete request message to the O-ASN. At this point, the relocation complete request message includes MSHash 2 generated by an authenticator server of the ASN-GW. After that, when receiving a relocation complete response message from the O-ASN, the ASN-GW informs the O-ASN of reception of the relocation complete response message.

After that, the ASN-GW ends the present algorithm.

As described above, in the case where an ASN of the MS that switches from an idle mode to an active mode changes, the N-ASN combines a relocation notify request message with IM-Exit information to transmit the same to the O-ASN. At this point, since a procedure at the O-ASN is the same as the procedure illustrated in FIG. 3, detailed description thereof is omitted.

Hereinafter, a procedure for relocating an ASN of an MS that operates in an active mode in a wireless communication system is described. Accordingly, it is assumed that an MS that changes an ASN operates in an active mode.

Figure 6:
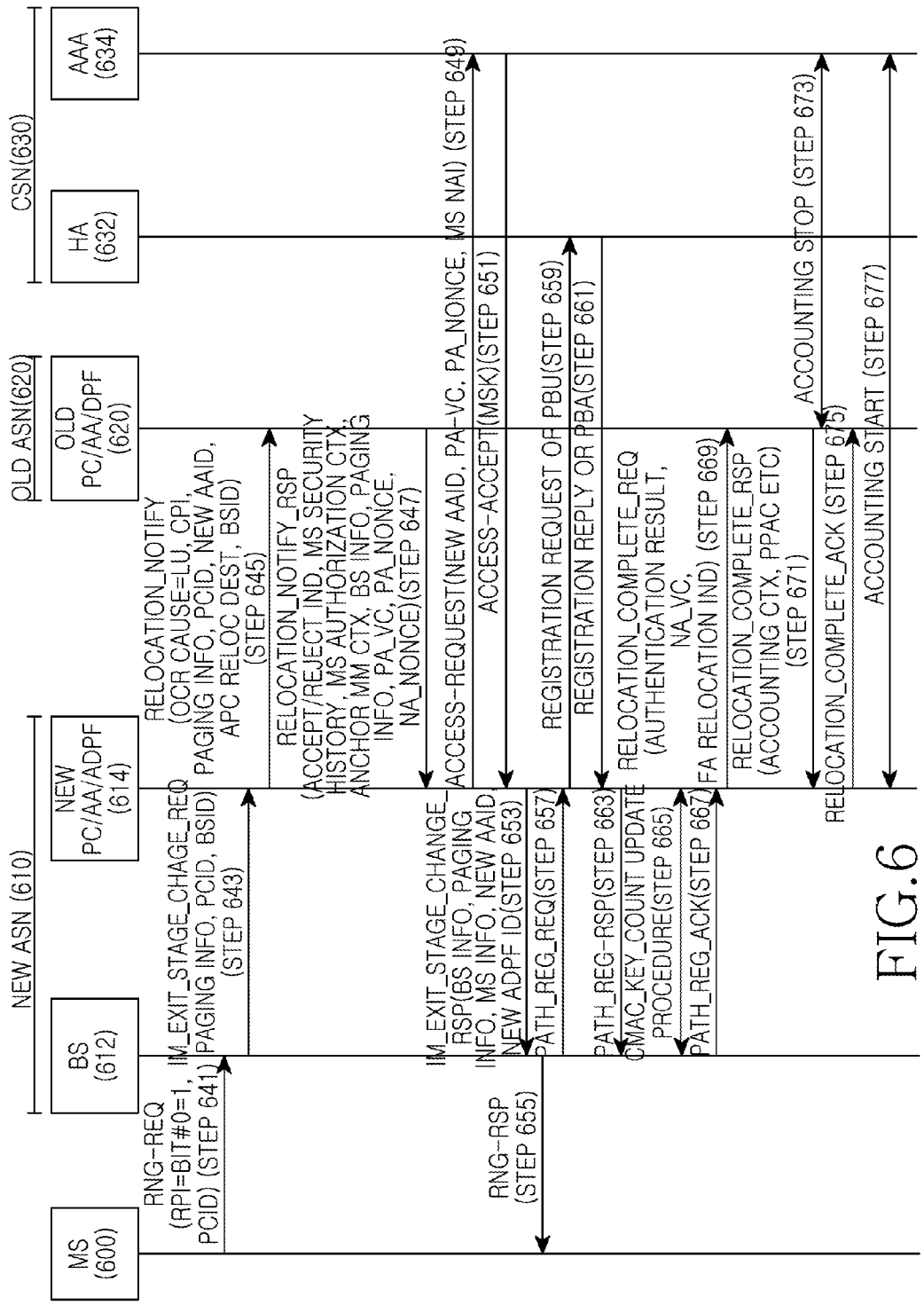
FIG. 6 is a diagram illustrating a combined relocation procedure by an IM-Exit trigger in a wireless communication system according to an exemplary embodiment of the present invention.

FIG. 6 is a diagram illustrating a combined relocation procedure by an IM-Exit trigger in a wireless communication system according to an exemplary embodiment of the present invention.

Referring to FIG. 6, the wireless communication system includes an MS 600, an N-ASN 610, an O-ASN 620, and a CSN 630. Here, the N-ASN 610 includes a base station 612 and an ASN-GW 614. In addition, the ASN-GW 614 includes a PC/AA/ADPF.

In the case where the MS 600 that has accessed a base station of the O-ASN 620 moves to the base station 612 of the N-ASN 610 through a handover, an ASN of the MS 600 changes to the N-ASN 610.

In this case, the MS 600 transmits a ranging request message RNG-REQ to the base station 612 in order to start an IM-Exit procedure in step 641. At this point, the ranging request message includes a RPI bit #0 for denoting IM-Exit and a PC ID TLV denoting trying network re-entry.

When the ranging request message is received, the base station 612 transmits an IM_Exit_Stage_Change request message to the ASN-GW 614 in step 643. For example, the base station 612 transmits an IM_Exit_Stage_Change request message to a relay PC of the ASN-GW 614.

When the IM_Exit_Stage_Change request message is received, the ASN-GW 614 determines whether combined relocation for ASN change of the MS 600 can be supported.

When the combined relocation can be supported, the ASN-GW 614 transmits a relocation notify message to the O-ASN 620 in step 645. At this point, the relocation notify message includes an OR type denoting a kind of a parameter included in the relocation notify message, CPI information set as an anchor PC context value, and authenticator server identifier information included in the ASN-GW. Here, it is assumed that the OR type denotes OCR cause information denoting combined relocation by an IM-Exit trigger.

When the relocation notify message is received, the O-ASN 620 determines whether combined relocation for ASN relocation of the MS 600 can be supported. When the combined relocation cannot be supported, the O-ASN 620 transmits a relocation notify response message including combined relocation failure information to the N-ASN 610 in step 647.

In contrast, when the combined relocation can be supported, the O-ASN 620 generates a hash value for an authentication variable of the MS that changes an ASN. The O-ASN 620 transmits a relocation notify response message including combined relocation success information to the N-ASN 610 in step 647. Here, the relocation notify response message includes a random variable 1 for authentication of the N-ASN and an H-AAA server, a random variable 2 for authentication with the N-ASN and the ASN-GW, a hash value for an authentication variable of the MS, identifier information of the MS, base station information, paging information, a security history of the MS, an authentication history context of the MS, and an anchor MM context.

The ASN-GW 614 determines whether the O-ASN 620 has accepted combined relocation through the relocation notify response message. When the O-ASN 620 has not accepted the combined relocation, the ASN-GW 614 transmits an IM_Exit_Stage_Change response message including combined relocation failure information to the base station 612.

In contrast, when the O-ASN 620 has accepted the combined relocation, the ASN-GW 614 determines authentication information of the MS 600 from the relocation notify response message. Here, the authentication information of the MS 600 includes a random variable 1 for authentication of the ASN-GW 614 and an AAA server 634, a random variable 2 for authentication of the ASN-GW 614 and the O-ASN 620, a hash value for an authentication variable of the MS 600, and identifier information of the MS 600.

The ASN-GW 614 requests an access to the AAA server 634 in step 649. At this point, the ASN-GW 614 transmits an access request message including a hash value for the authentication variable of the MS 600, a random variable 1, identifier information of the MS 600, and identifier information of the ASN-GW 614 to the AAA server 634.

The AAA server 634 determines whether the hash value for the authentication variable of the MS 600 included in the access request message is valid. When the hash value is valid, the AAA server 634 transmits an access accept message including access success information to the ASN-GW 614 in step 651. Here, the access accept message includes authentication variable information and MSK information.

In contrast, when the hash value is not valid, the AAA server 634 transmits an access response message including access failure information to the ASN-GW 614.

The ASN-GW 614 determines whether the AAA server 634 has accepted the access request from the access response message. When the AAA server 634 has not accepted the access request, the ASN-GW 614 transmits an IM_Exit_Stage_Change response message including failure indication set to a requested context unavailable value to the base station 612.

In contrast, when the AAA server 634 has accepted the access request, the ASN-GW 614 transmits an IM_Exit_Stage_Change response message including IM_Exit_Stage_Change success information to the base station 612 in step 653. At this point, the IM_Exit_Stage_Change response message includes an authentication server ID of an N-ASN, an ADPF ID of the N-ASN, MS information, and AK context information.

When receiving the IM_Exit_Stage_Change response message including failure indication set to a requested context unavailable value from the ASN-GW 614, the base station 612 transmits a ranging response message RNG-RSP including network entry start information to the MS 600.

In contrast, when receiving the IM_Exit_Stage_Change response message including IM_Exit_Stage_Change success information from the ASN-GW 614, the base station 612 determines whether a CMAC key value of the ranging request message provided from the MS 600 is valid. When the CMAC key value is valid, the base station 612 transmits a ranging response message RNG-RSP to the MS 600 in step 655.

In addition, when receiving the IM_Exit_Stage_Change response message including IM_Exit_Stage_Change success information from the ASN-GW 614, the base station 612 transmits a path registration request message to the ASN-GW 614 in step 657. For example, the base station 612 transmits a path registration request message to an ADPF of the ASN-GW 614.

When the path registration request message is received, the ASN-GW 614 transmits a registration request message or a PBU to an HA 632 in step 659.

When the registration request message or the PBU is received, the HA 632 transmits a registration response message or a PBA to the ASN-GW 614 in step 661.

When the registration response message or the PBA is received, the ASN-GW 614 transmits a path registration response message to the base station 612 in step 663. For example, an ADPF of the ASN-GW 614 transmits a path registration response message to the base station 612.

After transmitting the path registration response message to the base station 612, the ASN-GW 614 and the base station 612 update a CMAC key of the MS through negotiation in step 665.

After updating the CMAC key through negotiation with the ASN-GW 614, the base station 612 transmits a path registration ACK message Path_Reg_Ack to the ASN-GW 614 in step 667. For example, the base station 612 transmits a path registration ACK message to the ADPF of the ASN-GW 614.

After updating the CMAC key through negotiation with the base station 612, the ASN-GW 614 transmits a relocation complete request message Relocation_Complete_Req to the O-ASN 620 in step 669. At this point, the relocation complete request message includes MSKHash 2 generated by an authenticator server of the ASN-GW 614.

When the relocation complete request message is received, the O-ASN 620 authenticates the N-ASN 610 with consideration of a hash value included in the relocation complete request message. When authenticating the N-ASN 610, the O-ASN 620 transmits a relocation complete response message Relocation_Complete_Rsp to the N-ASN 610 in step 671. Here, the relocation complete response message includes billing context information and PPAQ information.

The O-ASN 620 performs a billing stop procedure with the AAA server 634 in step 673. For example, the O-ASN 620 transmits a billing stop message to the AAA server 634.

When receiving a relocation complete response message from the O-ASN 620, the ASN-GW 614 informs the O-ASN 620 of reception of the relocation complete response message in step 675.

The ASN-GW 614 performs a billing start procedure with the AAA server 634 in step 677. For example, the ASN-GW 614 transmits a billing start message to the AAA server 634.

The above exemplary embodiment has been described using an operation for ASN relocation of an MS that switches from an idle mode to an active mode as an example.

Figure 7A:
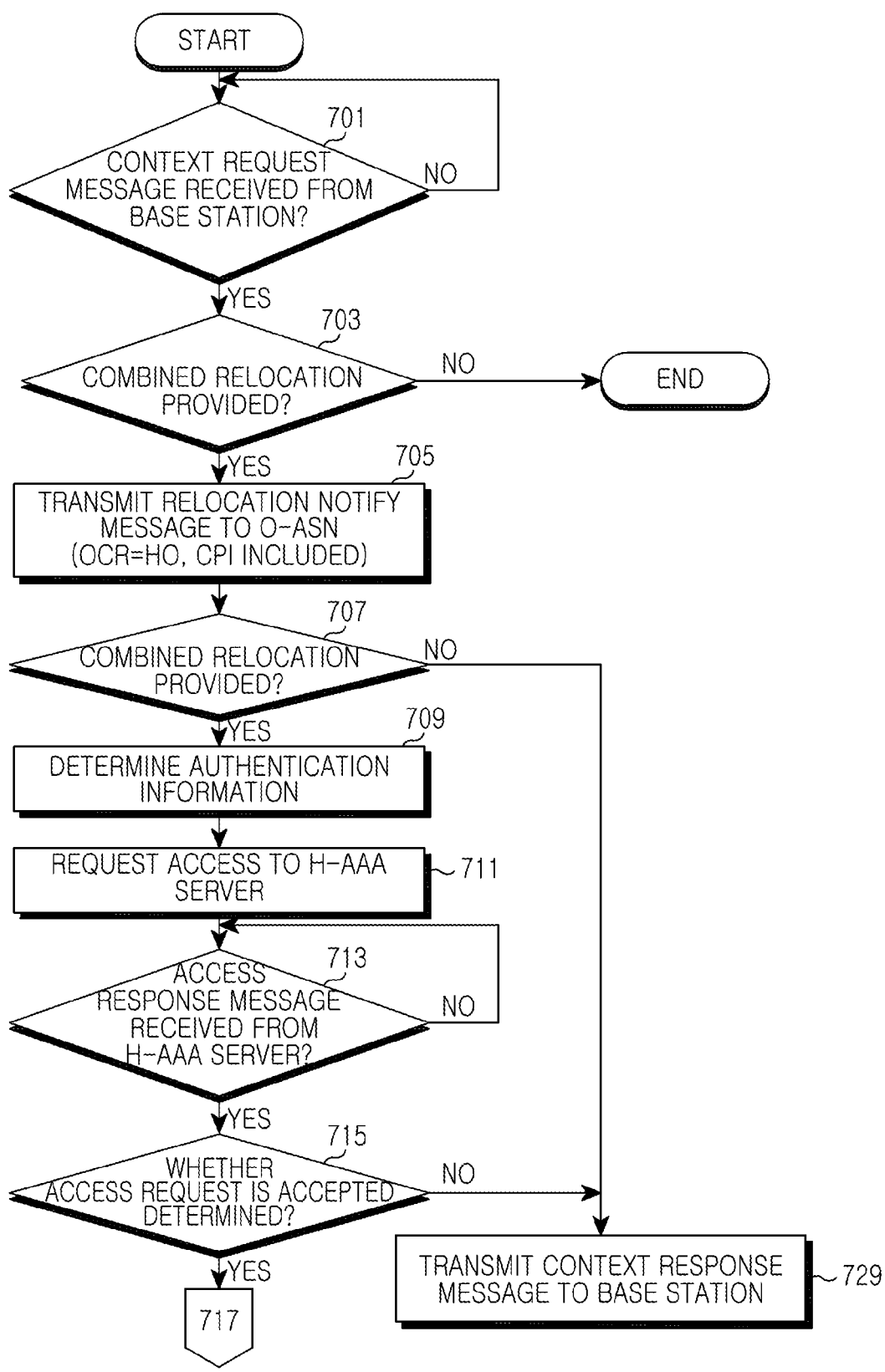
FIGS. 7A and 7B are flowcharts illustrating a relocation procedure by an active mode in an N-ASN according to an exemplary embodiment of the present invention.
Figure 7B:
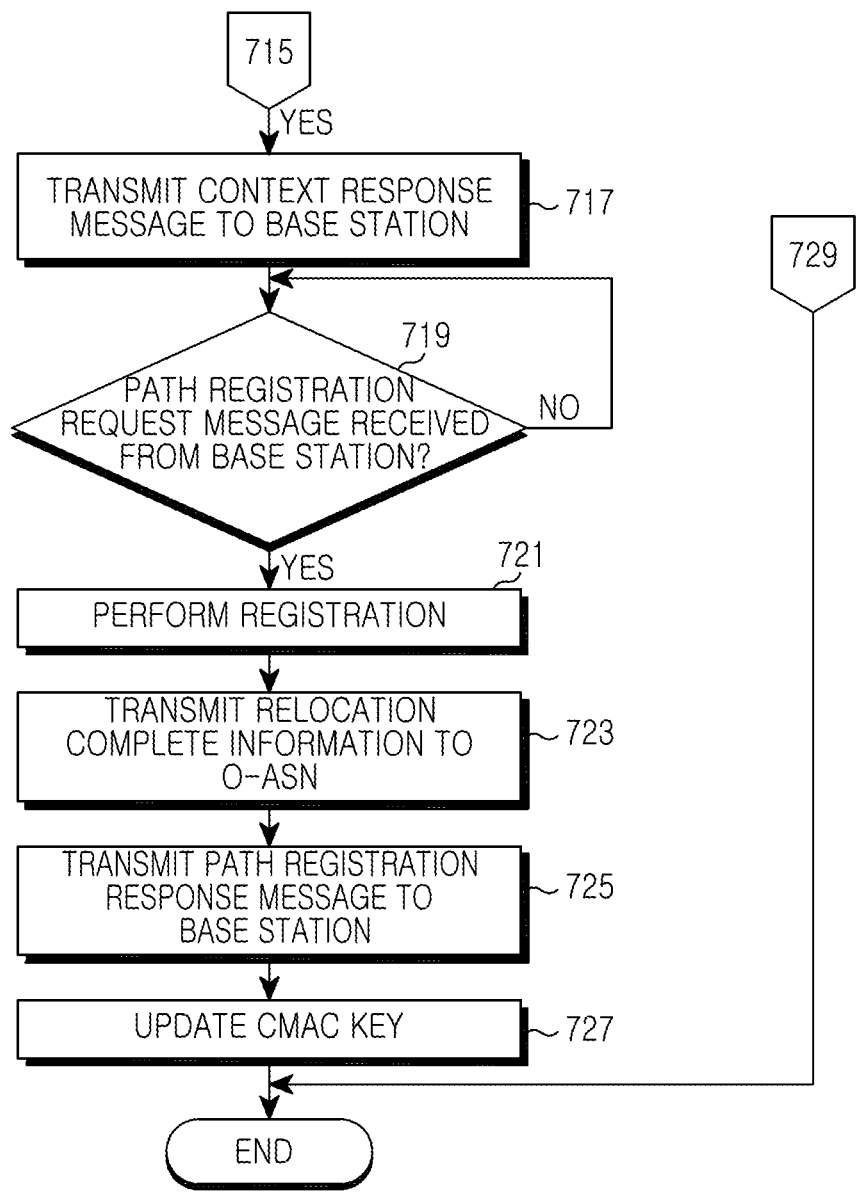

According to an exemplary embodiment of the present invention, in the case where an MS that has operated in the idle mode switches to the active mode during ASN change, the N-ASN operates as illustrated in FIGS. 7A and 7B in order change an ASN of the MS.

FIGS. 7A and 7B are flowcharts illustrating a relocation procedure by an active mode in an N-ASN according to an exemplary embodiment of the present invention.

Referring to FIGS. 7A and 7B, an ASN-GW of the N-ASN determines whether a context request message is received from a base station of the N-ASN in step 701.

When receiving the context request message from the base station, the ASN-GW determines whether combined relocation for ASN change of an MS can be supported in step 703.

When the combined relocation cannot be supported, the ASN-GW ends the present algorithm.

In contrast, when the combined relocation can be supported, the ASN-GW transmits a relocation notify message to an O-ASN of the MS in order to start ASN relocation of the MS using combined relocation in step 705. At this point, the relocation notify message includes an OR type denoting a kind of a parameter included in the relocation notify message, CPI information set as MS AK context, and authentication context information of the MS. Here, it is assumed that the OR type denotes OCR cause information denoting combined relocation by a handover trigger.

The ASN-GW determines whether the O-ASN can support combined relocation in step 707. For example, the ASN-GW determines whether the O-ASN can support combined relocation through the relocation notify response message provided from the O-ASN.

In the case where the O-ASN cannot support the combined relocation, the ASN-GW transmits a context response message including failure indication set to a requested context unavailable value to the base station that has transmitted the context request message (in step 701) in step 729.

After that, the ASN-GW ends the present algorithm.

In contrast, when the O-ASN can support the combined relocation, the ASN-GW determines authentication information of the MS that changes an ASN from the relocation notify response message provided from the O-ASN in step 709. Here, the authentication information of the MS includes a random variable 1 for authentication of the ASN-GW and an H-AAA server, a random variable 2 for authentication of the ASN-GW and the O-ASN, a hash value for an authentication variable of the MS, and identifier information of the MS.

After determining the authentication information of the MS, the ASN-GW transmits the hash value of the authentication variable of the MS provided from the O-ASN to the H-AAA server in step 711. For example, the ASN-GW transmits an access request message including the hash value for the authentication variable of the MS, a random variable 1, identifier information of the MS, and identifier information of the ASN-GW to the H-AAA server.

The ASN-GW determines whether an access response message is received from the H-AAA server in step 713.

When the access response message is received from the H-AAA server, the ASN-GW determines whether the H-AAA server has accepted an access request of the ASN-GW in step 715.

When the H-AAA server has not accepted the access request of the ASN-GW, the ASN-GW transmits a context response message including failure indication set to a requested context unavailable value to the base station in step 729.

After that, the ASN-GW ends the present algorithm.

In contrast, when the H-AAA server has accepted the access request of the ASN-GW, the ASN-GW transmits a context response message including context request success information to the base station in step 717. At this point, the context response message includes AK context, an authenticator server ID of an N-ASN, and anchor GW ID information of the N-ASN.

After transmitting the context response message, the ASN-GW determines whether a path registration request message is received from the base station in step 719.

When the path registration request message is received from the base station, the ASN-GW performs a registration procedure with an HA/LMA in step 721. For example, the ASN-GW transmits a registration request message or a PBU to the HA/LMA. After that, the ASN-GW receives a registration response message or a PBA from the HA/LMA.

The ASN-GW transmits relocation complete information to the O-ASN in step 723. For example, the ASN-GW transmits a relocation complete request message to the O-ASN. At this point, the relocation complete request message includes MSKHash 2 generated by an authenticator server of the ASN-GW. After that, when receiving a relocation complete response message from the O-ASN, the ASN-GW informs the O-ASN of reception of the relocation complete response message.

After transmitting the relocation complete information to the O-ASN, the ASN-GW transmits a path registration response message to the base station in step 725. For example, an ADPF of the ASN-GW transmits a path registration response message to the base station.

After transmitting the path registration response message to the base station, the ASN-GW updates a CMAC key of the MS through negotiation with the base station in step 727.

After that, the ASN-GW ends the present algorithm.

In the case where an ASN of the MS that operates in the active mode changes as described above, the N-ASN combines a relocation notify request message with handover information to transmit the same to the O-ASN. At this point, the O-ASN operates as illustrated in FIG. 8.

Figure 8:
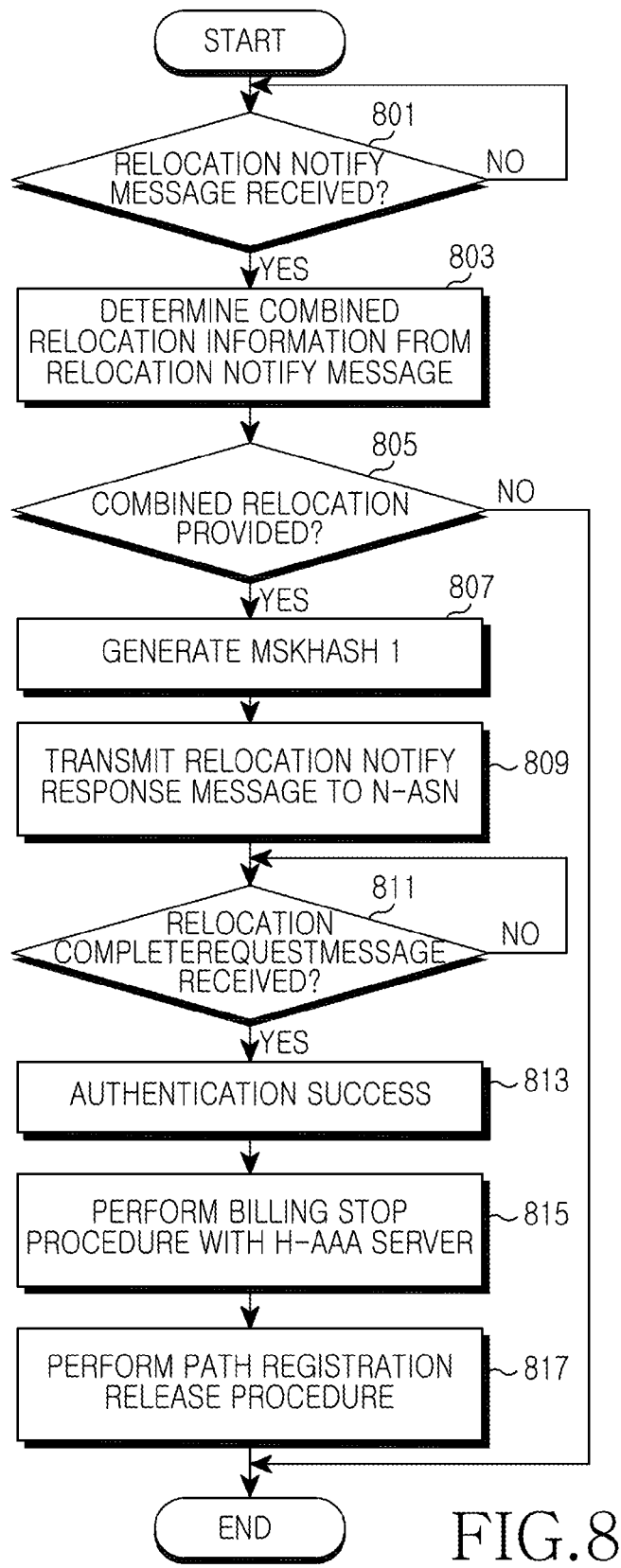
FIG. 8 is a flowchart illustrating a relocation procedure by an active mode in an O-ASN according to an exemplary embodiment of the present invention.

FIG. 8 is a flowchart illustrating a relocation procedure by an active mode in an O-ASN according to an exemplary embodiment of the present invention.

Referring to FIG. 8, an ASN-GW of the O-ASN determines whether a relocation notify message is received from an N-ASN in step 801.

When the relocation notify message is received from the N-ASN, the ASN-GW determines combined relocation information from the relocation notify message in step 803.

The ASN-GW determines whether combined relocation for ASN relocation of an MS can be supported in step 805.

When the combined relocation cannot be supported, the ASN-GW ends the present algorithm. In this case, the ASN-GW transmits a relocation notify response message including combined relocation failure information to the N-ASN.

In contrast, when the combined relocation can be supported, the ASN-GW generates a hash value for an authentication variable of the MS that changes an ASN in step 807.

After generating the hash value, the ASN-GW transmits a relocation notify response message to the N-ASN in step 809. Here, the relocation notify response message includes a random variable 1 for authentication of the N-ASN and an H-AAA server, a random variable 2 for authentication with the N-ASN and the ASN-GW, a hash value for an authentication variable of the MS, identifier information of the MS, base station information, paging information, a security history of the MS, an authentication history context of the MS, and an anchor MM context.

The ASN-GW determines whether a relocation complete request message is received from the N-ASN in step 811.

When receiving the relocation complete request message from the N-ASN, the ASN-GW authenticates the N-ASN with consideration of the hash value included in the relocation complete request message in step 813. In this case, though not shown, the ASN-GW transmits a relocation complete response message to the N-ASN.

After authenticating the N-ASN, the ASN-GW performs a billing stop procedure with the H-AAA server in step 815. For example, the ASN-GW transmits a billing stop message to the H-AAA server.

After performing the billing stop procedure, the ASN-GW performs a registration release procedure for a path with a base station of the O-ASN and the MS in step 817.

After that, the ASN-GW ends the present algorithm.

Hereinafter, a procedure for changing an ASN of an MS in a wireless communication system is described.

Figure 9:
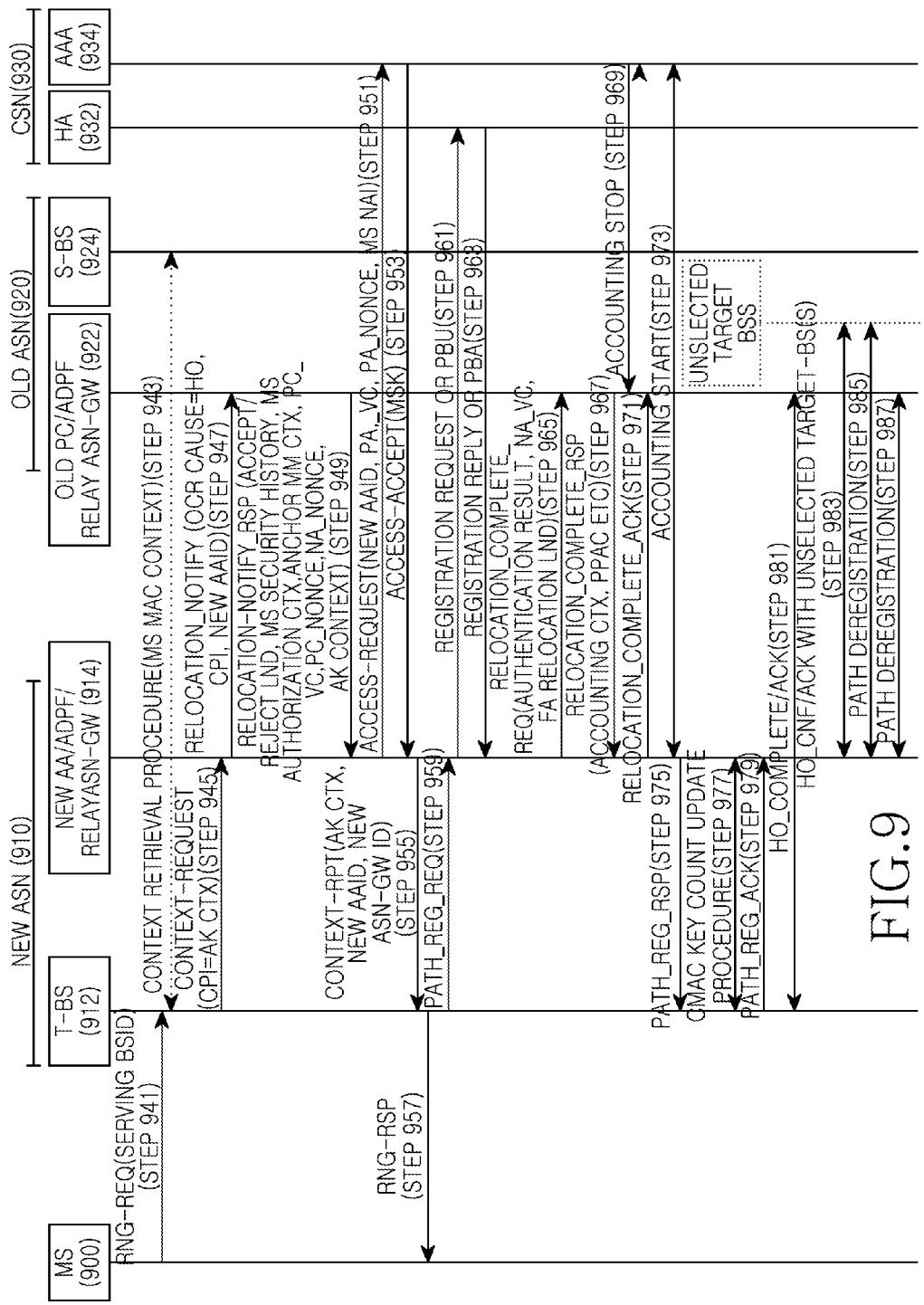
FIG. 9 is a diagram illustrating a combined relocation procedure by an active mode in a wireless communication system according to an exemplary embodiment of the present invention.

FIG. 9 is a diagram illustrating a combined relocation procedure by an active mode in a wireless communication system according to an exemplary embodiment of the present invention.

Referring to FIG. 9, the wireless communication system includes an MS 900, an N-ASN 910, an O-ASN 920, and a CSN 930. Here, the N-ASN 910 includes a base station 1 912 and an ASN-GW 1 914. The O-ASN 920 includes a base station 2 924 and an ASN-GW 2 922. At this point, each of the ASN-GWs 914 and 922 includes a PC/AA/ADPF.

In the case where the MS 900 that has accessed the base station 2 924 moves to the base station 1 912 via a handover, the ASN of the MS 900 changes to the N-ASN 910. At this point, the MS 900 operates in an active mode.

In this case, the MS 900 transmits a ranging request message RNG-REQ including a serving base station ID to the base station 2 912 in step 941. Here, the serving base station denotes a base station accessed by the MS 900 during the handover. In this case, the base station 2 924 serves as the serving base station.

When the ranging request message is received, the base station 1 912 performs a context correction procedure with the base station 2 924 in step 943. That is, when the base station 1 912 does not have previously corrected Media Access Control (MAC) context information of the MS 900, the base station 1 912 performs the context correction procedure with the base station 2 924 in order to obtain the MAC context of the MS 900.

The base station 1 912 transmits a context request message to the ASN-GW 1 914 in order to perform an AK correction procedure with an anchor authenticator server in step 945.

When the context request message is received, the ASN-GW 1 914 determines whether combined relocation for ASN relocation of the MS 900 can be supported.

When the ASN-GW 1 914 can support the combined relocation, the ASN-GW 1 914 transmits a relocation notify message to the ASN-GW 2 922 in step 947. At this point, the relocation notify message includes an OR type denoting a kind of a parameter included in the relocation notify message, CPI information set as MS AK context, and authentication context information of the MS. Here, it is assumed that the OR type denotes OCR cause information denoting combined relocation by a handover trigger.

When the relocation notify message is received, the ASN-GW 2 922 determines whether combined relocation for ASN change of the MS 900 can be supported. When the combined relocation cannot be supported, the ASN-GW 2 922 transmits a relocation notify response message including combined relocation failure information to the ASN-GW 1 914 in step 949.

In contrast, when the combined relocation can be supported, the ASN-GW 2 922 generates a hash value for an authentication variable of an MS that changes an ASN. The ASN-GW 2 922 transmits a relocation notify response message including combined relocation success information to the ASN-GW 1 914 in step 949. Here, the relocation notify response message includes a random variable 1 for authentication of the N-ASN and an H-AAA server, a random variable 2 for authentication with the N-ASN and the ASN-GW, a hash value for an authentication variable of the MS, identifier information of the MS, base station information, paging information, a security history of the MS, an authentication history context of the MS, and an anchor MM context.

The ASN-GW 1 914 determines whether the ASN-GW 2 922 has accepted combined relocation through the relocation notify response message. When the ASN-GW 2 922 has not accepted combined relocation, the ASN-GW 1 914 transmits a context response message including combined relocation failure information to the base station 1 912.

In contrast, when the ASN-GW 2 922 has accepted combined relocation, the ASN-GW 1 914 determines authentication information of the MS 900 from the relocation notify response message. Here, the authentication information of the MS 900 includes a random variable 1 for authentication of the ASN-GW 1 914 and an AAA server 934, a random variable 2 for authentication of the ASN-GW 1 914 and the ASN-GW 2 922, a hash value for an authentication variable of the MS 900, and identifier information of the MS 900.

The ASN-GW 1 914 requests an access to the AAA server 934 in step 951. At this point, the ASN-GW 1 914 transmits an access request message including a hash value for an authentication variable of the MS 900, a random variable 1, identifier information of the MS 900, and identifier information of the ASN-GW 1 914 to the AAA server 934.

The AAA server 934 determines whether the hash value for the authentication variable of the MS 900 included in the access request message is valid. When the hash value is valid, the AAA server 934 transmits an access response message including access success information to the ASN-GW 1 914 in step 953. Here, the access response message includes authentication variable information and MSK information.

In contrast, when the hash value is not valid, the AAA server 934 transmits an access response message including access failure information to the ASN-GW 1 914.

The ASN-GW 1 914 determines whether the AAA server 934 has accepted the access request from the access response message. When the AAA server 934 has not accepted the access request, the ASN-GW 1 914 transmits a context response message including failure indication set to a requested context unavailable value to the base station 1 912.

In contrast, when the AAA server 934 has accepted the access request, the ASN-GW 1 914 transmits a context response message including context success information to the base station 1 912 in step 955. At this point, the context response message includes an authenticator server ID of the N-ASN 910, an ADPF ID of the N-ASN 910, MS information, and AK context information.

When receiving a context response message including failure indication set to a requested context unavailable value from the ASN-GW 1 914, the base station 1 912 transmits a ranging response message RNG-RSP including network entry start information to the MS 900.

In contrast, when receiving a context response message including context success information from the ASN-GW 1 914, the base station 1 912 determines whether a CMAC key value of the ranging request message provided from the MS 900 is valid. When the CMAC key value is valid, the base station 1 912 transmits a ranging response message RNG-RSP to the MS 900 in step 957.

In addition, when receiving a context response message including context success information from the ASN-GW 1 914, the base station 1 912 transmits a path registration request message to the ASN-GW 1 914 in step 959.

When the path registration request message is received, the ASN-GW 1 914 transmits a registration request message or a PBU to an HA 932 in step 961.

When the registration request message or the PBU is received, the HA 932 transmits a registration response message or a PBA to the ASN-GW 1 914 in step 963.

When the registration response message or the PBA is received, the ASN-GW 1 914 transmits a relocation complete request message to the ASN-GW 2 922 in step 965. At this point, the relocation complete request message includes MSKHash 2 generated by an authenticator server of the ASN-GW 1 914.

When the relocation complete request message is received, the ASN-GW 2 922 authenticates the ASN-GW 1 914 with consideration of the hash value included in the relocation complete request message. When authenticating the ASN-GW 1 914, the ASN-GW 2 922 transmits a relocation complete response to the ASN-GW 1 914 in step 967. Here, the relocation complete response message includes billing context information and PPAQ information.

The ASN-GW 2 922 performs a billing stop procedure with the AAA server 934 in step 969. For example, the ASN-GW 2 922 transmits a billing stop message to the AAA server 934.

When receiving a relocation complete response message from the ASN-GW 2 922, the ASN-GW 1 914 informs the ASN-GW 2 922 of reception of the relocation complete response message in step 971.

The ASN-GW 1 914 performs a billing start procedure with the AAA server 934 in step 973. For example, the ASN-GW 1 914 transmits a billing start message to the AAA server 934.

The ASN-GW 1 914 transmits a path registration response message Path_Reg_Rsp to the base station 1 912 in step 975. For example, an ADPF of the ASN-GW 1 914 transmits a path registration response message to the base station 1 912.

After transmitting the path registration response message to the base station 1 912, the ASN-GW 1 914 and the base station 1 912 update a CMAC key of the MS through negotiation in step 977.

After updating the CMAC key through negotiation with the ASN-GW 1 914, the base station 1 912 transmits a path registration ACK message Path_Reg_Ack to the ASN-GW 1 914 in step 979. For example, the base station 1 912 transmits the path registration ACK message to the ADPF of the ASN-GW 1 914.

The base station 1 912 may successfully finish combined relocation and network re-entry by transmitting the path registration ACK message. In this case, the base station 1 912 and the base station 2 924 perform a handover complete procedure in step 981. For example, the base station 1 912 transmits a handover complete message HO Complete to the base station 2 924 in order to inform success of the handover to the base station 2 924. When receiving the handover complete message, the base station 2 924 informs the base station 1 912 of reception of the handover complete message.

After performing a handover complete procedure with the base station 1 912, the base station 2 924 performs a handover cancel procedure with unselected other target base stations in step 983. For example, the base station 2 924 transmits handover complete messages to the unselected other target base stations. At this point, a handover indicate type of the handover complete message is set to "cancel".

The base station 2 924 performs a data path registration release procedure in step 985. In addition, the ASN-GW 2 922 performs the data path registration release procedure in step 987.

At this point, a relocation notify message transmitted from the N-ASN to the O-ASN in FIGS. 4, 6, and 9 may be configured as in Table 1.

TABLE 1

| IE | Reference | M/O | Notes |
|---|---|---|---|
| Context Purpose Indicator | 5.3.2.36 | M | Bitmap indicating the required context. MS Security History should be always requested in this step (to request PMK SN, Anchor MM Context may also be requested). If OCR Cause is LU-Triggered, LSP Context bit shall be set. If OCR Cause is IM-Exit Triggered, Anchor PC Context bit shall be set. If OCR Cause is HO-Triggered, MS AK Context bit shall be set. |
| MS Info | 5.3.2.103 | M | Contains MS-related context in the nested IEs. |
| >Optimized Combined Relocation Cause | 5.3.2.Z0 | M | Indicates Optimized Combined Relocation Cause |
| >Authenticator ID | 5.3.2.19 | M | Indicates the ID of the "new Authenticator. |
| BS Info | 5.3.2.26 | O | Included if OCR Cause is LU-Triggered or IM-Exit Triggered. |
| > BS ID | 5.3.2.25 | CM | |
| Paging Information | 5.3.2.119 | O | Paging Information TLV contains PAGING_CYCLE, PAGING OFFSET, PAGING_INTERVAL_LENGTH, and Paging Group ID. The BS may make a suggestion for Paging Cycle and Paging Offset for the MS performing LU. Included if OCR Cause is LU-Triggered or IM-Exit Triggered. |
| > Paging Cycle | 5.3.2.118 | O | |
| > Paging Offset | 5.3.2.120 | O | |
| > Paging Interval Length | 5.3.2.135 | O | |
| > Paging Group ID | 5.3.2.123 | O | |
| >Anchor PC ID | 5.3.2.12 | CM | Shall be included if the OCR cause is IM-Exit-Triggered |
| >Relay PC ID | 5.3.2.117 | O | The Relay PC Identifier for the MS in Idle Mode, to be stored in Location Register during Location Update procedure. |
| >Anchor PC Relocation Destination | 5.3.2.13 | O | Identifier for destination Anchor PC in the event of Anchor PC relocation. |
| > IDLE Mode Retain Info | 5.3.2.81 | CM | IDLE Mode Retain Info. Shall be include if the OCR cause is IM-Exit Triggered |

In addition, a relocation notify response message transmitted from the O-ASN to the N-ASN in response to the relocation notify message may be configured as in Table 2.

TABLE 2

| IE | Reference | M/O | Notes |
|---|---|---|---|
| Failure Indication | 5.3.2.69 | O | |
| Accept/Reject Indicator | 5.3.2.1 | M | Indicates Accept/reject of the corresponding request. |
| MS Info | 5.3.2.103 | M | Contains MS-related context in the nested IEs. |
| >Mobility Access Classifier | 5.3.2.423 | O | Indicates the mobility access classification of the subscriber. It Shall be included if the MS mobility access classifier is known at the Anchor Authenticator to be Fixed or Nomadic. |
| >Reattachment Zone | 5.3.2.424 | O | Indicates the mobility access classification of the subscriber. It Shall be included if the MS mobility access classifier is known at the Anchor Authenticator to be Fixed or Nomadic. |
| > MS Security History | 5.3.2.108 | M | MS Security history - PMK SN. |
| >>PMK SN | 5.3.2.133 | M | |
| >>MS NAI | 5.3.2.105 | M | |
| >>PMIP-Authenticated-Network-Identity | 5.3.2.41 | O | Include when assigned by AAA in the RADIUS Access-Accept or the Diameter WDEA. Indicate authorized PMIP NAI for use by PMIP Client. The above enables the PMIP NAI context to be passed along with the MS NAI TLV during authenticator relocation. |
| >>Authorization Policy Support | 5.3.2.21 | M | |
| >>VAAA IP Address | 5.3.2.201 | O | If the MS is re-authenticating via the visited CSN, either VAAA IP Address or VAAA Realm or both SHALL be included. |

TABLE 2-continued

| IE | Reference | M/O | Notes |
|---|---|---|---|
| >>VAAA Realm | 5.3.2.202 | O | If the MS is re-authenticating via the visited CSN, either VAAA IP Address or VAAA Realm or both SHALL be included. |
| > MS Authorization Context | 5.3.2.100 | M | Contains Authorization context parameters of the specific MS. |
| >>MS NAI | 5.3.2.105 | M | |
| >>PMIP-Authenticated-Network-Identity | 5.3.2.41 | O | Include when assigned by AAA in the RADIUS Access-Accept or Diameter WDEA. Indicate authorized PMIP NAI for use by PMIP Client. The above enables the PMIP NAI context to be passed along with the MS NAI TLV during authenticator relocation. |
| >>PA_VC (MSKHash1) | 5.3.2.Z1 | M | MSKHash1 is generated by the present Authenticator |
| >>PA_NONCE(nonce1) | 5.3.2.Z2 | M | |
| >>NA_NONCE(nonce2) | 5.3.2.Z3 | M | |
| >>R3 WiMAX Capability | 5.3.2.207 | M | |
| >>> R3 WiMAX-Release | 5.3.2.441 | M | WiMAX release negotiated during Initial Network Entry. |
| >>>R3 Accounting Capabilities | 5.3.2.208 | M | This TLV SHALL be included if R3 WiMAX-Capability is included in the transmitted message. |
| >>R3 CUI | 5.3.2.210 | O | |
| >>R3 Class | 5.3.2.211 | O | |
| >>R3 Framed IP Address | 5.3.2.212 | O | |
| >>R3 Framed-IPv6-Prefixs | 5.3.2.213 | O | |
| >>R3 Visited-Framed-IP-Address | 5.3.2.362 | O | |
| >>R3 Visited-Framed-IPv6-Prefixs | 5.3.2.363 | O | |
| >>R3 Framed-Interface-Ids | 5.3.2.364 | O | |
| >>R3 Visited-Framed-Interface-Ids | 5.3.2.365 | O | |
| >>R3 WiMAX Session ID | 5.3.2.214 | M | |
| >>R3 Packet Flow Descriptor | 5.3.2.215 | M | |
| >>>R3 Packet Data Flow ID | 5.3.2.216 | M | |
| >>>R3 Service Profile ID | 5.3.2.218 | O | This TLV May be included during Authenticator Relocation. |
| >>>R3 Uplink QoS ID | 5.3.2.222 | O | This TLV May be included during Authenticator Relocation. |
| >>>R3 Downlink QoS ID | 5.3.2.223 | O | This TLV May be included during Authenticator Relocation. |
| >>>SFID | 5.3.2.184 | M | Associated SFID (one or two). |
| > REG Context | 5.3.2.144 | O | Identifies the profile of the capabilities of the registered MS. |
| >>Number of UL Transport CIDs Support | 5.3.2.288 | CM | This TLV SHALL be included if REG Context is included in the transmitted message. |
| >>Number of DL Transport CIDs Support | 5.3.2.289 | CM | This TLV SHALL be included if REG Context is included in the transmitted message. |
| >>Classification/PHS Options and SDU Encapsulation Support | 5.3.2.290 | CM | This TLV SHALL be included if REG Context is included in the transmitted message. |
| >>Maximum Number of Classifier | 5.3.2.291 | CM | This TLV SHALL be included if REG Context is included in the transmitted message. |
| >>PHS Support | 5.3.2.292 | CM | This TLV SHALL be included if REG Context is included in the transmitted message. |
| >>ARQ Support | 5.3.2.293 | CM | This TLV SHALL be included if REG Context is included in the transmitted message. |
| >>DSx Flow Control | 5.3.2.294 | CM | This TLV SHALL be included if REG Context is included in the transmitted message. |
| >>Maximum MAC Data per Frame Support | 5.3.2.296 | CM | This TLV SHALL be included if REG Context is included in the transmitted message. |
| >>>Maximum amount of MAC Level Data per DL Frame | 5.3.2.297 | CM | This TLV SHALL be included if Maximum MAC Data per Frame Support is included in the transmitted message. |
| >>>Maximum amount of MAC Level Data per UL Frame | 5.3.2.298 | CM | This TLV SHALL be included if Maximum MAC Data per Frame Support is included in the transmitted message. |
| >>Packing Support | 5.3.2.299 | CM | This TLV SHALL be included if REG Context is included in the transmitted message. |
| >>MAC ertPS Support | 5.3.2.300 | CM | This TLV SHALL be included if REG Context is included in the transmitted message. |
| >>Maximum Number of Bursts Transmitted Concurrently to the MS | 5.3.2.301 | CM | This TLV SHALL be included if REG Context is included in the transmitted message. |

TABLE 2-continued

| IE | Reference | M/O | Notes |
|---|---|---|---|
| >>HO Supported | 5.3.2.302 | CM | This TLV SHALL be included if REG Context is included in the transmitted message. |
| >>HO Process Optimization MS Timer | 5.3.2.303 | CM | This TLV SHALL be included if REG Context is included in the transmitted message. |
| >>Mobility Features Supported | 5.3.2.304 | CM | This TLV SHALL be included if REG Context is included in the transmitted message. |
| >>Sleep Mode Recovery Time | 5.3.2.305 | CM | This TLV SHALL be included if REG Context is included in the transmitted message. |
| >>Idle Mode Timeout | 5.3.2.268 | CM | This TLV SHALL be included if REG Context is included in the transmitted message. |
| >>ARQ Ack Type | 5.3.2.307 | CM | This TLV SHALL be included if REG Context is included in the transmitted message. |
| >>MS HO Connections Parameters Proc Time | 5.3.2.308 | CM | This TLV SHALL be included if REG Context is included in the transmitted message. |
| >>MS HO TEK Proc Time | 5.3.2.309 | CM | This TLV SHALL be included if REG Context is included in the transmitted message. |
| >>MAC Header and Extended Sub-Header Support | 5.3.2.310 | CM | This TLV SHALL be included if REG Context is included in the transmitted message. |
| >>System Resource Retain Timer | 5.3.2.311 | O | |
| >>MS Handover Retransmission Timer | 5.3.2.312 | O | |
| >>Handover Indication Readiness Timer | 5.3.2.313 | CM | This TLV SHALL be included if REG Context is included in the transmitted message. |
| >>BS Switching Timer | 5.3.2.314 | CM | This TLV SHALL be included if REG Context is included in the transmitted message. |
| >>Power Saving Class Capability | 5.3.2.315 | CM | This TLV SHALL be included if REG Context is included in the transmitted message. |
| > State | 5.3.2.355 | O | State attribute as received in most recent message from AAA server. |
| > Anchor MM Context | 5.3.2.11 | O | Contains FA context for the MS. If the Anchor Authenticator is collocated with the FA, it may provide it in response to the serving ASN request (indicated by Context Purpose Indicator). |
| >>MS Mobility Mode | 5.3.2.104 | CM | This TLV SHALL be included if Anchor MM Context is included in the transmitted message. |
| >>MIP4 Info | 5.3.2.96 | M | Mobility context of the MS. |
| >>>HA IP Address | 5.3.2.75 | M | IP address of the current HA. |
| >>>Home Address (HoA) | 5.3.2.77 | M | Home Address (HoA). |
| >>>Care-of Address (CoA) | 5.3.2.28 | M | Care-of Address (CoA). |
| >>>Registration Lifetime | 5.3.2.147 | M | The remaining Mobile IP registration lifetime (measured in seconds). |
| Context Purpose Indicator | 5.3.2.36 | M | Bitmap indicating the required context. |
| BS Info | 5.3.2.26 | O | Includes only if LU-Triggered Combined Relocation |
| > BS ID | 5.3.2.25 | CM | BS ID indicating the BS where MS performs location update. |
| > AK Context | 5.3.2.6 | O | Security context required for BS to validate the received RNG-REQ message from MS and respond with RNG-RSP signed by a valid HMAC/CMAC digest. |
| >>AK | 5.3.2.5 | CM | This TLV SHALL be included if AK Context is included in the transmitted message. |
| >>AK ID | 5.3.2.7 | CM | This TLV SHALL be included if AK Context is included in the transmitted message. |
| >>AK Lifetime | 5.3.2.8 | CM | This TLV SHALL be included if AK Context is included in the transmitted message. |
| >>AK SN | 5.3.2.9 | CM | This TLV SHALL be included if AK Context is included in the transmitted message. |
| >>CMAC_KEY_COUNT | 5.3.2.34 | CM | This TLV SHALL be included if AK Context is included in the transmitted message. |
| MS Info | 5.3.2.103 | O | MS Info to be included in the event of PC relocation. |
| > Authenticator ID | 5.3.2.19 | O | |
| >Anchor ASN GW ID | 5.3.2.10 | O | This is included if PC Relocation Request has been accepted or is being requested. |
| >Mobility-Access-Classifier | 5.3.2.423 | O | Included if PC Relocation Request has been accepted or is being requested. |
| >Reattachment-Zone | 5.3.2.424 | O | Included if PC Relocation Request has been accepted or is being requested. |
| Paging Information | 5.3.2.119 | O | Paging Information TLV contains PAGING_CYCLE, PAGING OFFSET, PAGING_INTERVAL_LENGTH and Paging Group ID. |
| >Paging Cycle | 5.3.2.118 | O | Anchor PC SHALL include this if BS had included a suggestion for this TLV. |
| >Paging Offset | 5.3.2.120 | O | Anchor PC SHALL include this if BS had included a suggestion for this TLV. |

TABLE 2-continued

| IE | Reference | M/O | Notes |
|---|---|---|---|
| >Paging Interval Length | 5.3.2.135 | O | Anchor PC SHALL include this if BS had included a suggestion for this TLV. |
| >Paging Group ID | 5.3.2.123 | O | |
| > Old Anchor PC ID | 5.3.2.113 | O | This TLV is included in the event of PC relocation. |
| > Anchor PC ID | 5.3.2.12 | O | This TLV is included in the event of PC relocation. |
| >Anchor PC Relocation Request Response | 5.3.2.14 | O | "Accept" or "Refuse" Included only if PC Relocation is requested. |
| >Location Update Status | 5.3.2.88 | O | Shall be included if location update was successful, and SHALL not be included otherwise. If location update was refused or failure occurred, this is indicated by inclusion of the Failure Indication TLV. |
| PC Relocation Indication | 5.3.2.122 | O | Included by the Current Anchor PC to request PC relocation is included only in this message. |
| MS Info | | | |
| > SBC context | 5.3.2.174 | O | Included based on the bits set in the Idle mode retain information TLV. See IEEE802.16e-2005. |
| >>Subscriber Transition Gaps | 5.3.2.316 | CM | This TLV SHALL be included if SBC Context is included in the transmitted message. |
| >>Maximum Transmit Power | 5.3.2.317 | CM | This TLV SHALL be included if SBC Context is included in the transmitted message. |
| >>Capabilities for Construction and Transmission of MAC PDUs | 5.3.2.318 | CM | This TLV SHALL be included if SBC Context is included in the transmitted message. |
| >>PKM Flow Control | 5.3.2.319 | CM | This TLV SHALL be included if SBC Context is included in the transmitted message. |
| >>Maximum Number of Supported Security Associations | 5.3.2.320 | CM | This TLV SHALL be included if SBC Context is included in the transmitted message. |
| >>Security negotiation parameters | 5.3.2.321 | CM | This TLV SHALL be included if SBC Context is included in the transmitted message. |
| >>>Authorization Policy Support | 5.3.2.21 | CM | This TLV SHALL be included if Security negotiation parameters is included in the transmitted message. |
| >>>MAC Mode | 5.3.2.323 | CM | This TLV SHALL be included if Security negotiation parameters is included in the transmitted message. |
| >>>PN Window Size | 5.3.2.324 | CM | This TLV SHALL be included if Security negotiation parameters is included in the transmitted message. |
| >>Extended Subheader Capability | 5.3.2.325 | CM | This TLV SHALL be included if SBC Context is included in the transmitted message. |
| >>HO Trigger Metric Support | 5.3.2.326 | CM | This TLV SHALL be included if SBC Context is included in the transmitted message. |
| >>Current Transmit Power | 5.3.2.327 | CM | This TLV SHALL be included if SBC Context is included in the transmitted message. |
| >>OFDMA SS FFT Sizes | 5.3.2.328 | CM | This TLV SHALL be included if SBC Context is included in the transmitted message. |
| >>OFDMA SS demodulator | 5.3.2.329 | CM | This TLV SHALL be included if SBC Context is included in the transmitted message. |
| >>OFDMA SS modulator | 5.3.2.330 | CM | This TLV SHALL be included if SBC Context is included in the transmitted message. |
| >>The number of UL HARQ Channel | 5.3.2.331 | CM | This TLV SHALL be included if SBC Context is included in the transmitted message. |
| >>OFDMA SS Permutation support | 5.3.2.332 | CM | This TLV SHALL be included if SBC Context is included in the transmitted message. |
| >>OFDMA SS CINR Measurement Capability | 5.3.2.333 | CM | This TLV SHALL be included if SBC Context is included in the transmitted message. |
| >>The number of DL HARQ Channels | 5.3.2.334 | CM | This TLV SHALL be included if SBC Context is included in the transmitted message. |
| >>HARQ Chase Combining and CC-IR Buffer Capability | 5.3.2.335 | CM | This TLV SHALL be included if SBC Context is included in the transmitted message. |
| >>OFDMA SS Uplink Power Control Support | 5.3.2.336 | CM | This TLV SHALL be included if SBC Context is included in the transmitted message. |
| >>OFDMA SS Uplink Power Control Scheme Switching Delay | 5.3.2.337 | CM | This TLV SHALL be included if SBC Context is included in the transmitted message. |
| >>OFDMA MAP Capability | 5.3.2.338 | CM | This TLV SHALL be included if SBC Context is included in the transmitted message. |
| >>Uplink Control Channel Support | 5.3.2.339 | CM | This TLV SHALL be included if SBC Context is included in the transmitted message. |
| >>OFDMA MS CSIT Capability | 5.3.2.340 | CM | This TLV SHALL be included if SBC Context is included in the transmitted message. |
| >>Maximum Number of Burst per Frame Capability in HARQ | 5.3.2.341 | CM | This TLV SHALL be included if SBC Context is included in the transmitted message. |
| >>OFDMA SS demodulator for MIMO Support | 5.3.2.342 | CM | This TLV SHALL be included if SBC Context is included in the transmitted message. |

TABLE 2-continued

| IE | Reference | M/O | Notes |
|---|---|---|---|
| >>OFDMA SS modulator for MIMO Support | 5.3.2.343 | CM | This TLV SHALL be included if SBC Context is included in the transmitted message. |
| >>OFDMA parameters sets | 5.3.2.50 | CM | This TLV SHALL be included if SBC Context is included in the transmitted message. |
| > REG context | 5.3.2.144 | O | Included based on the bits set in the Idle mode retain information TLV. See IEEE802.16e-2005. |
| >>Number of UL Transport CIDs Support | 5.3.2.288 | CM | This TLV SHALL be included if REG Context is included in the transmitted message. |
| >>Number of DL Transport CIDs Support | 5.3.2.289 | CM | This TLV SHALL be included if REG Context is included in the transmitted message. |
| >>Classification/PHS Options and SDU Encapsulation Support | 5.3.2.290 | CM | This TLV SHALL be included if REG Context is included in the transmitted message. |
| >>Maximum Number of Classifier | 5.3.2.291 | CM | This TLV SHALL be included if REG Context is included in the transmitted message. |
| >>PHS Support | 5.3.2.292 | CM | This TLV SHALL be included if REG Context is included in the transmitted message. |
| >>ARQ Support | 5.3.2.293 | CM | This TLV SHALL be included if REG Context is included in the transmitted message. |
| >>DSx Flow Control | 5.3.2.294 | CM | This TLV SHALL be included if REG Context is included in the transmitted message. |
| >>Maximum MAC Data per Frame Support | 5.3.2.296 | CM | This TLV SHALL be included if REG Context is included in the transmitted message. |
| >>>Maximum amount of MAC Level Data per DL Frame | 5.3.2.297 | CM | This TLV SHALL be included if Maximum MAC Data per Frame Support is included in the transmitted message. |
| >>>Maximum amount of MAC Level Data per UL Frame | 5.3.2.298 | CM | This TLV SHALL be included if Maximum MAC Data per Frame Support is included in the transmitted message. |
| >>Packing Support | 5.3.2.299 | CM | This TLV SHALL be included if REG Context is included in the transmitted message. |
| >>MAC ertPS Support | 5.3.2.300 | CM | This TLV SHALL be included if REG Context is included in the transmitted message. |
| >>Maximum Number of Bursts Transmitted Concurrently to the MS | 5.3.2.301 | CM | This TLV SHALL be included if REG Context is included in the transmitted message. |
| >>HO Supported | 5.3.2.302 | CM | This TLV SHALL be included if REG Context is included in the transmitted message. |
| >>HO Process Optimization MS Timer | 5.3.2.303 | CM | This TLV SHALL be included if REG Context is included in the transmitted message. |
| >>Mobility Features Supported | 5.3.2.304 | CM | This TLV SHALL be included if REG Context is included in the transmitted message. |
| >>Sleep Mode Recovery Time | 5.3.2.305 | CM | This TLV SHALL be included if REG Context is included in the transmitted message. |
| >>Idle Mode Timeout | 5.3.2.268 | CM | This TLV SHALL be included if REG Context is included in the transmitted message. |
| >>ARQ Ack Type | 5.3.2.307 | CM | This TLV SHALL be included if REG Context is included in the transmitted message. |
| >>MS HO Connections Parameters Proc Time | 5.3.2.308 | CM | This TLV SHALL be included if REG Context is included in the transmitted message. |
| >>MS HO TEK Proc Time | 5.3.2.309 | CM | This TLV SHALL be included if REG Context is included in the transmitted message. |
| >>MAC Header and Extended Sub-Header Support | 5.3.2.310 | CM | This TLV SHALL be included if REG Context is included in the transmitted message. |
| >>System Resource Retain Timer | 5.3.2.311 | O | |
| >>MS Handover Retransmission Timer | 5.3.2.312 | O | |
| >>Handover Indication Readiness Timer | 5.3.2.313 | CM | This TLV SHALL be included if REG Context is included in the transmitted message. |
| >>BS Switching Timer | 5.3.2.314 | CM | This TLV SHALL be included if REG Context is included in the transmitted message. |
| >>Power Saving Class Capability | 5.3.2.315 | CM | This TLV SHALL be included if REG Context is included in the transmitted message. |
| > Authenticator ID | 5.3.2.19 | M | Anchor Authenticator of the MS. |
| > Anchor ASN GW ID | 5.3.2.10 | M | Anchor DPF/FA of the MS. |
| > SF Info | 5.3.2.185 | O | |
| >> SFID | 5.3.2.184 | CM | This TLV SHALL be included if SF Info is included in the transmitted message. |
| > SA Descriptor | 5.3.2.170 | O | Included in this message by the BS (if cached a priori by that BS) and is in response to bits set in the Idle mode retain information TLV received from the MS |
| >>SAID | 5.3.2.169 | CM | This TLV SHALL be included if SA Descriptor is included in the transmitted message. |
| >>SA Type | 5.3.2.173 | CM | This TLV SHALL be included if SA Descriptor is included in the transmitted message. |
| >>SA Service Type | 5.3.2.172 | O | This attribute SHALL be included only when the SA type is Static SA or Dynamic SA. |

TABLE 2-continued

| IE | Reference | M/O | Notes |
|---|---|---|---|
| >>Older TEK Parameters | 5.3.2.112 | O | This TLV MAY be included if SA Descriptor is included in the transmitted message. |
| >>>PN Counter | 5.3.2.136 | O | When AES CCM is selected, the TLV SHALL be included. |
| >>>RxPN Counter | 5.3.2.166 | O | When AES CCM is selected, the TLV SHALL be included. |
| >>>TEK | 5.3.2.187 | CM | This TLV SHALL be included if Older TEK Parameters is included in the transmitted message. |
| >>>TEK SN | 5.3.2.189 | CM | This TLV SHALL be included if Older TEK Parameters is included in the transmitted message. |
| >>>TEK Lifetime | 5.3.2.188 | CM | This TLV SHALL be included if Older TEK Parameters is included in the transmitted message. |
| >>Newer TEK Parameters | 5.3.2.110 | O | This TLV MAY be included if SA Descriptor is included in the transmitted message. |
| >>>PN Counter | 5.3.2.136 | O | When AES CCM is selected, the TLV SHALL be included. |
| >>>RxPN Counter | 5.3.2.166 | O | When AES CCM is selected, the TLV SHALL be included. |
| >>>TEK | 5.3.2.187 | CM | This TLV SHALL be included if Newer TEK Parameters is included in the transmitted message. |
| >>>TEK SN | 5.3.2.189 | CM | This TLV SHALL be included if Newer TEK Parameters is included in the transmitted message. |
| >>>TEK Lifetime | 5.3.2.188 | CM | This TLV SHALL be included if Newer TEK Parameters is included in the transmitted message. |
| >>Cryptographic Suite | 5.3.2.38 | CM | This TLV SHALL be included if SA Descriptor is included in the transmitted message. |

When a relocation notify message is received from the N-ASN, the O-ASN transmits a relocation notify response message configured as in Table 2 to the N-ASN. However, in case of a "re-authentication lock" state, the O-ASN may reject a request corresponding to a relocation notify message from the N-ASN. Here, the "re-authentication lock" denotes a state where a third ASN requests the O-ASN to perform auth relocation before the N-ASN transmits a relocation notify message to the O-ASN.

In addition, a relocation complete request message transmitted from the N-ASN to the O-ASN may be configured as in Table 3.

TABLE 3

| IE | Reference | M/O | Notes |
|---|---|---|---|
| Context Purpose Indicator | 5.3.2.36 | O | Indicates the requested context. This TLV may be included only if Authentication Result indicates "success" |
| MS Info | 5.3.2.103 | M | Contains MS-related context in the nested IEs. |
| >Authentication Result | 5.3.2.18 | M | Indicates the results of EAP authentication process. It SHALL be set to indicate "success" if Reauthentication has been successfully completed in the "new" Authenticator. Otherwise, it should indicate "Failure" |
| >FA Relocation Indication | 5.3.2.71 | O | Indicates the FA relocation process. It SHALL be set to indicate "success" if FA relocation has been Successfully completed with authenticator relocation. Otherwise it should indicate "Failure" |
| >MSKHash2 | 5.3.2.Z4 | O | Indicates the hash value of the new authenticator. MSKhash2 = HMAC-SHA1 (MSK, Nonce2); |

In addition, a context request message transmitted from a base station of the N-ASN to the ASN-GW may be configured as in Table 4.

TABLE 4

| IE | Reference | M/O | Notes |
|---|---|---|---|
| Context Purpose Indicator | 5.3.2.36 | M | Set to indicate retrieval of AK Context. |
| MS Info | 5.3.2.103 | M | |
| >Authenticator ID | 5.3.2.19 | M | |
| BS Info (Serving) | 5.3.2.26 | M | Included in order to allow the Authenticator to apply authorization policies depending on SBS. |
| > Serving/Target Indicator | 5.3.2.182 | M | Set to Serving. |
| >BS ID | 5.3.2.25 | M | |
| BS Info (Target) (one or more)* | 5.3.2.26 | M | |
| > Serving/Target Indicator | 5.3.2.182 | M | Set to Target. |
| >BS ID | 5.3.2.25 | M | |

A response message in response to the context request message configured as in Table 4 may be configured as in Table 5. At this point, the response message is transmitted from an authenticator server gateway to a target gateway.

TABLE 5

| IE | Reference | M/O | Notes |
|---|---|---|---|
| Failure Indication | 5.3.2.69 | O | Request Success or request failure or partial response. |
| Context Purpose Indicator | 5.3.2.36 | M | Set to indicate that that the Report contains AK Context. |
| MS Info | 5.3.2.103 | O | |
| >Service Authorization Code | 5.3.2.181 | O | May be included to convey Authorization Policy to the Target BS. |
| >Authenticator ID | 5.3.2.19 | CM | New Authenticator ID |
| >Anchor ASN GW ID | 5.3.2.10 | CM | New Anchor ASN-GW ID |
| BS Info (Target) | 5.3.2.26 | M | Note 1. |
| >BS ID | 5.3.2.25 | M | |
| > AK Context | 5.3.2.6 | M | |
| >>AK | 5.3.2.5 | M | |
| >>AK ID | 5.3.2.7 | M | |
| >>AK Lifetime | 5.3.2.8 | M | |
| >>AK SN | 5.3.2.9 | M | |
| >>CMAC_KEY_COUNT | 5.3.2.34 | M | |
| Result Code | 5.3.2.154 | O | Provide result status for this message. If the result status is any value other than 0, then this TLV SHALL be included. (Note 2). |

In addition, CPI included in the relocation notify message may be denoted as in Table 6.

TABLE 6

| Type | 36 |
|---|---|
| Length in octets | 4 |
| Value | 32-bit Bitmask. |
| | Bit #0 = MS AK Context. |
| | Bit #1 = MS Network Context |
| | Bit #2 = MS MAC Context |
| | Bit #3 = MS Authorization Context |
| | Bit #4 = Anchor MM Context |
| | Bit #5 = Accounting context |
| | Bit #6 = MS Security History |
| | Bit #7 = SA Context |
| | Bit #8 = MN-FA key context |
| | Bit #9 = FA-HA key context |
| | Bit #10 = DHCP-Relay-Info |
| | Bit #11 = Security Context Delivery |
| | Bit #12 = MIP6 handover successful |
| | Bit #13 = Online Accounting context |

TABLE 6-continued

| | Bit #14 = Offline Accounting context |
|---|---|
| | Bit #15 = Location Update Response Context (LUR Context) |
| | Bit #16 = Anchor PC Context (APC Context) |
| | All other bits are Reserved. |

In addition, an MS authentication context included in the relocation notify response message may be denoted as in Table 7.

TABLE 7

| Type | 100 | |
|---|---|---|
| Length in octets | Variable | |
| Value Description | Compound | |
| | TLV Name | M/O |
| Elements (Sub-TLVs) | MS NAI | M |
| | PMIP-Authenticated-Network-Identity | O |
| | R3 WiMAX Capability | M |
| | R3 CUI | O |
| | R3 Class | O |
| | R3 Framed IP Address | O |

TABLE 7-continued

| | R3 Framed-IPv6-Prefix | O |
|---|---|---|
| | R3 Framed-Interface-Id | O |
| | R3 Visited-Framed-IP-Address | O |
| | R3 Visited-Framed-IPv6-Prefix | O |
| | R3 Visited-Framed-Interface-Id | O |
| | R3 WiMAX Session ID | M |
| | R3 Packet Flow Descriptor | M |
| | R3 QoS Descriptor | O |
| | R3 Acct Interim Interval | O |
| | Authorized Network Services | O |
| | Visited Authorized Network Services | O |
| | PA_VC(MSKHash1) | O |
| | PA_NONCE(Nonce1) | O |
| | NA_NONCE(Nonce2) | O |
| Parent TLV | MS Info | |

MS information of Table 7 may be denoted as in Table 8.

TABLE 8

| | | |
|---|---|---|
| Type | 103 | |
| Length in octets | Length of MS Info is set as 'Variable' | |
| Value | Compound | |
| Description | Information about the MS. | |
| | TLV Name | M/O |
| Elements (Sub-TLVs) | MSID | O |
| | SF Info | O |
| | PPAQ | O |
| | Anchor ASN GW ID | O |
| | Authenticator ID | O |
| | SA Descriptor | O |
| | Service Authorization Code | O |
| | REG Context | O |
| | SBC Context | O |
| | Anchor MM Context | O |
| | MS Security History | O |
| | MS Authorization Context | O |
| | Combined Resource Indicator | O |
| | Authentication Result | O |
| | DHCP relay info | O |
| | FA Relocation Indication | O |
| | BS-originated EAP Start Flag | O |
| | CMAC_KEY_COUNT | O |
| | VLANTagProcessingRule | O |
| | Key Change Indicator | O |
| | State | O |
| | NSP ID | O |
| | Data Integrity Capability | O |
| | Mobility Access Classifier | O |
| | Reattachment Zone | O |
| | LBS Loc Info | O |
| | LBS Transaction ID | O |
| | LBS Result Code | O |
| | NA_VC (MSKHash2) | O |
| Message Primitives That Use This TLV | Every Message | |

NV-VC of Table 8 is fixedly used when authenticator server shifting is used.

OCR cause included in the relocation notify message may be denoted as in Table 9.

TABLE 9

| | |
|---|---|
| Type | TBD |
| Length in octets | 1 |
| Value | 0x00 - LU-Triggered |
| | 0x01 - IM-Exit Triggered |
| | 0x02 - HO Triggered |

TABLE 9-continued

| | |
|---|---|
| Description | Indicate the trigger cause of Optimized Combined Relocation |
| Parent TLV(s) | MS_Info |

Present Authenticator Validation Code (PA VC) included in the relocation notify response message may be denoted as in Table 10.

TABLE 10

| | |
|---|---|
| Type | TBD |
| Length in octets | TBD (32) |
| Value | Hash value of PA_VC (MSKHash1) |
| Description | |
| Parent TLV(s) | MS Authorization Context |

PA NONCE included in the relocation notify response message may be denoted as in Table 11.

TABLE 11

| | |
|---|---|
| Type | TBD |
| Length in octets | TBD (32) |
| Value | PA_NONCE (nonce1) |
| Description | |
| Parent TLV(s) | MS Authorization Context |

NA NONCE included in the relocation notify response message may be denoted as in Table 12.

TABLE 12

| | |
|---|---|
| Type | TBD |
| Length in octets | TBD (32) |
| Value | PA_NONCE(Nonce2) |
| Description | |
| Parent TLV(s) | MS Authorization Context |

NA VCNONCE included in the relocation complete request response message may be denoted as in Table 13.

TABLE 13

| | |
|---|---|
| Type | TBD |
| Length in octets | TBD (32) |
| Value | Hash value using NA_VC (MSKHash2) |
| Description | |
| Parent TLV(s) | MS Info |

RADIUS between NAS and an H-AAA server may be configured as in Table 14. Here, the RADIUS message denotes an access request message transmitted by the N-ASN to the H-AAA server in order to perform an access request.

TABLE 14

| Attribute | TYPE | Description | Access Request | Access Chall. | Access Accept | Reject |
|---|---|---|---|---|---|---|
| User-Name | 1 | NAI obtained from the EAP-Response Identity (Outer-NAI). | 1 | 0 | 0-1 | 0 |
| Service-Type | 6 | Set to "Framed" for initial authentication and set to "Authenticate-Only" indicating Re-authentication. It MAY also be set to "Authorize-Only" when using to obtain prepaid quotas mid-session. | 1 | 0 | 0-1 | 0 |

TABLE 14-continued

| Attribute | TYPE | Description | Access Request | Access Chall. | Access Accept | Reject |
|---|---|---|---|---|---|---|
| Framed-MTU | 12 | As used by WiMAX, as per [50] in an Access-Request during EAP authentication, this attribute provides the appropriate MTU size to avoid exceeding maximum payload size for PKMv2 (2008 bytes) during EAP exchange (the appropriate fragmentation is assumed in Authentication Server on the EAP application layer). The value of this attribute should be set between 1020 and 2000 bytes (the recommended value is 1400 bytes)." In an Access-Accept the use is as per [35]. | 0-1[m] | 0 | 0-1[m] | 0 |
| EAP-Message | 79 | The EAP exchanged transported over RADIUS. | 10-n[aa] | 1-n | 1-n | 1-n |
| Message-Authenticator | 80 | Provides integrity protection for the RADIUS packets as required by [50]. | 1 | 1 | 1 | 1 |
| WiMAX-Capability | 26/1 | Identifies the WiMAX Capabilities supported by the NAS. Indicates capabilities selected by the RADIUS server. | 1 | 0 | 0-1[u] | 0 |
| NAS-Identifier | 32 | This attribute contains a string identifying the NAS or HA origination the Access-Request. The format SHALL be the fully qualified domain name of the NAS. | 1[b] | 0 | 0 | 0 |
| NAS-Port-Type | 61 | Identifies the type of port the request is associated with. Set to 27 for "Wireless-IEEE 802.16" when coming from a WiMAX ASN. | 1 | 0 | 0 | 0 |
| Calling-Station-Id | 31 | Set to the MAC address of the device as a 17 byte Upper Case ASCII value as defined by RFC 3580 sec 3.21 and 802-2001 in canonical order. For example "00-10-A4-23-19-C0" is Valid and 00-10-a4-23-19-c0 is not valid; and 00:10:A4:23:19:C0 is not valid. | 1 | 0 | 0 | 0 |
| CUI | 89 | Indication for support and desire to have the HAAA provide Chargeable User Identity. The NAS commits to include the CUI in all RADIUS Accounting packets. | 0-1 | 0 | 0-1[a] | 0 |
| GMT-Time-Zone-Offset | 26/3 | The offset in seconds from GMT at the NAS. | 1 | 0 | 0 | 0 |
| NAS-IP-Address | 4 | NAS IP Address. | 0-1[b] | 0 | 0 | 0 |
| NAS-IPv6-Address | 95 | NAS-IPv6 address. | 0-1[b] | 0 | 0 | 0 |
| Error-Cause | 101 | Error Codes generated during access authentication [49]. | 0 | 0-1 | 0 | 0-1 |
| Class | 25 | Opaque value set by the Server used to bind authentication to accounting. | 0 | 0 | 0-1[h] | 0 |
| Framed-IP-Address | 8 | The IP4 address assigned to the MS by HCSN. | 0 | 0 | 0-1[c] | 0 |

TABLE 14-continued

| Attribute | TYPE | Description | Access Request | Access Chall. | Access Accept | Reject |
|---|---|---|---|---|---|---|
| Visited-Framed-IP-Address | 26/79 | The IP4 address assigned to the MS by VCSN. | 0-1[t] | 0 | 0-1[t] | 0 |
| Session-Timeout | 27 | The maximum number of seconds of service to be provided to the user before termination of the session. Associated with the lifetime of the keys derived from the EAP authentication (i.e., MSK, EMSK and keys derived from EMSK). Session-Timeout in an Access-Challenge packet is used set the EAP-retransmission timer as per [50]. | 0 | 0-1 | 0-1[d] | 0 |
| Termination-Action | 29 | Indicates what action the NAS should take when service is completed. | 0 | 0 | 0-1[d] | 0 |
| WiMAX-Session-Id | 26/4 | A unique identifier in the home realm for this Session as set by the HAAA. | 0-1[e] | 0-1 | 1 | 0 |
| MSK | 26/5 | The Master Session Key derived as the result of successful EAP Authentication. | 0 | 0 | 0-1[f] | 0 |
| Packet-Flow-Descriptor | 26/28 | The pre-provisioned Service Flows. (This Attribute is deprecated in this release). | 0 | 0 | 0[y] | 0 |
| Packet-Flow-Descriptor-V2 | 26/84 | The pre-provisioned Service Flows | 0 | 0 | 1-n | 0 |
| QoS-Descriptor | 26/29 | The QoS descriptor for the pre-provisioned flows. | 0 | 0 | 0-n[j] | 0 |
| VLANTagProcessing-Descriptor | 26/211 | The VLANTagProcessing descriptor for the pre-provisioned flows | 0 | 0 | 0-n[v] | 0 |
| BS-ID | 26/46 | Indicates the NAP-ID and BS-ID at the time the message was delivered. | 0-1[n] | 0 | 0 | 0 |
| BS-Location | 26/88 | May be used as an alternative Serving BS identifier and usually indicates the location information of the BS which may be described as Lat/Long/Sector/Carrier information of the serving BS. | 0-1 | 0 | 0 | 0 |
| Mobility-Access-Classifier | 26/89 | Indicates the classification of the subscriber at the H-AAA as a fixed, nomadic or mobile access subscriber. | 0 | 0 | 0-1 | 0 |
| NAP-ID | 26/45 | Indicated the operator id of the NAP at the time the message was delivered. | 0-1[n] | 0 | 0 | 0 |
| Acct-Interim-Interval | 85 | Indicates the number of seconds between each interim update in seconds for this specific session. | 0 | 0 | 0-1 | 0 |
| NSP-ID | 26/57 | The Operator ID of the NSP. | 0-1[p] | 0 | 0 | 0 |
| Time-Of-Day-Time | 26/20 | The tariff time change for volume billing and duration billing. | 0 | 0 | 0-n | 0 |
| PMIP-Authenticated-Network-Identity | 26/78 | The Proxy Mobile IP identity allocated by the network after Authentication. | 0-1[z] | 0 | 0-1 | 0 |
| DNS | 26/52 | The IPv4/IPv6 address of the DNS server. | 0 | 0 | 0-n[r] | 0 |
| State | 24 | A magic cookie to be returned along with user's response. | 0-1[s] | 0-1[s] | 0-1[s] | 0 |

TABLE 14-continued

| Attribute | TYPE | Description | Access Request | Access Chall. | Access Accept | Reject |
|---|---|---|---|---|---|---|
| Framed-IPv6-Prefix | 97 | Unique prefix to be assigned to the MS by Home CSN. | 0 | 0 | 0-1 | 0 |
| Framed-Interface-Id | 96 | The IPv6 interface id assigned by the Home CSN to be used for the MS. Used only for DHCPv6-based address configuration. | 0 | 0 | 0-1 | 0 |
| Visited-Framed-IPv6-Prefix | 26/80 | The unique prefix assigned to the MS by Visited CSN. | 0-1[t] | 0 | 0-1[t] | 0 |
| Visited-Framed-Interface-Id | 26/81 | The IPv6 interface id assigned by the visited CSN to be used for the MS. Used only for DHCPv6-based address configuration. | 0-1[t] | 0 | 0-1[t] | 0 |
| MS-Authenticated | 26/90 | Indication that MS has successfully performed device authentication | 0 | 0 | 0-1 | 0 |
| Operator-Name | To be assigned by IETF | Operator-Name contains the Visited NSP's WRI-Code in the Access-Request and Home NSP's WRI-Code in the Access-Accept | 0-1[w] | 0 | 0-1[x] | 0 |
| PA_VC (MSKHash1) | 26/TBD | | 0-1[aa] | 0 | 0 | 0 |
| PA_NONCE (nonce1) | 26/TBD | | 0-1[aa] | 0 | 0 | 0 |

As described above, exemplary embodiments of the present invention provide an advantage of reducing a time delay caused by ASN change by simplifying a procedure for changing an ASN of an MS in a communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for changing an Access Service Network (ASN) of a Mobile Station (MS) in a communication system, the method comprising:
   when an MS that operates in an idle mode moves from a first ASN to a second ASN, transmitting, at the MS, a ranging request message to a base station of the second ASN in order to update a location;
   transmitting, at the base station, a location update request message to an ASN-GateWay (GW) of the second ASN according to the ranging request message;
   transmitting, at the ASN-GW, a relocation notify message comprising type information for location update and an Optimized Relocation (OR) type comprising Optimized Combined Relocation (OCR) cause information to the first ASN when the location update request message is received; and
   transmitting, at the first ASN, a relocation notify response message comprising paging information to the ASN-GW according to the relocation notify message,
   wherein the OCR cause information denotes Location Update (LU) trigger information.

2. The method of claim 1, wherein the ASN-GW comprises a Paging Controller (PC), an Anchor Authenticator (AA), and an Anchor Data Path Function (ADPF).

3. The method of claim 1, wherein the relocation notify message further comprises at least one of Context Purpose Indicator (CPI) information set as a relocation update response context, identifier information of an authenticator server included in the ASN-GW, anchor PC relocation destination information, and, in a case of the ASN-GW intends to update at least one of a Paging Group IDentifier (PG ID), paging offset information, and a paging period Type-Length Value (TLV), the PG ID, the paging offset information, and the paging period TLV.

4. The method of claim 1, wherein the relocation notify response message comprises at least one of at least one random variable for authentication of the second ASN, a hash value for an authentication variable of the MS, identifier information of the MS, base station information, paging information, a security history of the MS, an authentication history context of the MS, and an anchor Mobility Management (MM) context.

5. The method of claim 1, further comprising:
   after receiving the relocation notify response message transmitted by the first ASN, requesting, at the ASN-GW, an access to an Authentication, Authorization, Accounting (AAA) server; and
   determining, at the AAA server, whether to accept an access request of the ASN-GW.

6. The method of claim 5, wherein the requesting of the access to the AAA server comprises requesting, at the ASN-GW, an access to the AAA server using authentication information of the MS determined from the relocation notify response message.

7. A communication system for changing an Access Service Network (ASN) of a Mobile Station (MS), the system comprising:
   an MS that operates in an idle mode, for transmitting a ranging request message to a base station of a second ASN in order to update a location when moving from a first ASN to the second ASN; and a base station for transmitting a location update request message to an ASN-GateWay (GW) of the second ASN according to the ranging request message of the MS;

wherein the ASN-GW, when a location update request message of the base station is received, transmits a relocation notify message comprising type information for location update and an Optimized relocation (OR) type comprising Optimized Combined Relocation (OCR) cause information to the first ASN; and wherein the first ASN transmits a relocation notify response message comprising paging information to the ASN-GW according to the relocation notify message of the ASN-GW, wherein the OCR cause information value denotes Location Update (LU) trigger information.

8. The system of claim 7, wherein the ASN-GW comprises a Paging Controller (PC), an Anchor Authenticator (AA), and an Anchor Data Path Function (ADPF).

9. The system of claim 7, wherein the relocation notify message further comprises at least one of Context Purpose Indicator (CPI) information set as a relocation update response context, identifier information of an authenticator server included in the ASN-GW, anchor PC relocation destination information, and, in a case of the ASN-GW intends to update at least one of a Paging Group IDentifier (PG ID), paging offset information, and a paging period Type-Length Value (TLV), the PG ID, the paging offset information, and the paging period TLV.

10. The system of claim 7, wherein the relocation notify response message comprises at least one of at least one random variable for authentication of the second ASN, a hash value for an authentication variable of the MS, identifier information of the MS, base station information, paging information, a security history of the MS, an authentication history context of the MS, and an anchor Mobility Management (MM) context.

11. The system of claim 7, further comprising an Authentication, Authorization, Accounting (AAA) server for determining whether to accept an access request of the ASN-GW, wherein after receiving the relocation notify response message transmitted by the first ASN, the ASN-GW requests an access to the AAA server.

12. The system of claim 11, wherein the ASN-GW requests the access to the AAA server using authentication information of the MS determined from the relocation notify response message.

* * * * *